United States Patent [19]

Kanaan

[11] Patent Number: 5,382,030
[45] Date of Patent: Jan. 17, 1995

[54] COLLET AND METHOD FOR OPTIMIZING GRIPPING ACTION THEREOF

[75] Inventor: Roger J. Kanaan, Easley, S.C.
[73] Assignee: Jacobs Chuck Technology Corp., Wilmington, Del.
[21] Appl. No.: 178,229
[22] Filed: Jan. 6, 1994

Related U.S. Application Data

[63] Continuation-in-part of Ser. No. 940,666, Sep. 4, 1992, abandoned.

[51] Int. Cl.[6] ............................................. B23B 3/20
[52] U.S. Cl. ................................... 279/46.7; 279/158
[58] Field of Search ............................. 279/43.7–43.9, 279/46.1, 46.7–46.9, 157, 158

[56] References Cited

U.S. PATENT DOCUMENTS

| | | |
|---|---|---|
| 2,346,706 | 4/1944 | Stoner . |
| 2,583,885 | 1/1952 | Russenberger . |
| 2,985,456 | 5/1961 | Stoner . |
| 3,246,903 | 4/1966 | Sattler . |
| 3,583,714 | 6/1971 | Weltzer et al. . |
| 4,309,041 | 1/1982 | Peterson et al. . |
| 4,576,530 | 3/1986 | Hans et al. . |
| 4,989,887 | 2/1991 | Jordan . |
| 5,123,663 | 6/1992 | Mizoguchi . |

OTHER PUBLICATIONS

British Standards Institution—Specification For Machine Tool Components Entwurf, Aug. 1989—Deutsche Norm.
Deutsche Norm—Nov., 1957—Drawback Collets and Taper Sleeves for Collets.
Deutsche Normen—Apr., 1961—Puch Out Collets.
Deutsche—Normen—May, 1977.
Deutsche Norm—Jul., 1986.
Japanese Industrial Standard—Spring Collets.
Advertisement—Kennametal—Erickson Rotating NC Tooling.
Advertisement—Rego—Fix—Switzerland.
Advertisement—Hirschmann Corporation.
Advertisement—Fahrion, Germany.
Advertisement—Pfander Precision Tools.
Advertisement—Universal NC Toolholding Systems.
Advertisement—Hardinge HQC Quick Change Collet System.
Advertisement—Ortlieb Drill Holders.
Advertisement—Jacobs Series 900, Jacobs Rubber—Flex Collets.
Advertisement—Jacobs—The New Generation of Collet Chucks for Toolholding Rubber—Flex.

*Primary Examiner*—Steven C. Bishop
*Attorney, Agent, or Firm*—Dority & Manning

[57] ABSTRACT

The present invention relates to a method and process for manufacturing an improved machine tool collet. The invention further relates to an improved machine tool collet having design parameters optimized to maximize the gripping strength of the collet. The collet according to the invention is of the type having a plurality of gripping jaws spaced around a common longitudinal axis with resilient material between the gripping jaws. The method includes calculating the total torque generated on a bar passing through the collet for a given collet configuration having predetermined design parameters. The total torque includes the torque generated just prior to a toggle condition occurring between the gripping jaws and the bar and the maximum moment force generated between the gripping jaws and the bar at a toggle condition. At least one of the design parameters of the collet, such as jaw thickness or number of jaws, is varied and the total torque generated is recalculated until the total torque reaches a maximum value for the given collet configuration. In this manner, at least one design parameter can be varied and optimized for maximizing the gripping strength of the collet.

65 Claims, 12 Drawing Sheets

COLLET AND METHOD FOR OPTIMIZING GRIPPING ACTION THEREOF

This application is a continuation-in-part of application Ser. No. 07/940,666 filed Sep. 4, 1992, now abandoned.

BACKGROUND OF THE INVENTION

The present invention relates to a collet, and more particularly to an improved collet having optimized parameters to maximize gripping strength, and a method for making same.

U.S. Pat. No. 2,346,706 to Stoner and assigned to the Jacobs Manufacturing Company describes a collet having a plurality of flat-sided gripping members. The gripping members are held in relative position equally spaced about a common axis. The spaces between the gripping members are filled with an adherent resilient material, such as rubber or rubber composition. The gripping members are also transversely perforated. In this case, the resilient rubber material not only fills the space between adjacent gripping members, but it also passes through the perforations in the gripping members thereby forming a plurality of longitudinally spaced continuous annular rings which hold the gripping members in desired relative positions. This collet was a significant improvement over the conventional split steel collets and is widely recognized today by those skilled in the art and commonly known as the Rubber-Flex® collet. However, prior to applicant's present invention, it was not known to optimize the gripping strength of the Rubber-Flex® collet by determining optimum design parameters for the gripping blades or "jaws." Although a number of jaws having varying thicknesses were utilized in the collets, it was not commonly believed that gripping strength could be maximized by deducing the optimum number of gripping jaws for a given configuration which would fit around the inner diameter of the collet while maintaining at least a minimum amount of the resilient material between the gripping jaws. Additionally, the thickness of the gripping jaws was generally not considered as effecting gripping strength. Typically, the jaw thickness was dictated by the size or inside diameter of the collet. In other words, smaller diameter collets had thinner jaw blades.

U.S. Pat. No. 5,123,663 to Mizoguchi discloses a method for determining the minimum number of segments for a metal collet by determining the range of a central angle (theta) where the geometrical moment of inertia for each segment is constant with respect to a line passing through the centroid of the section perpendicular to a radial direction of the collet. The patent discloses that the range of angle theta is less than 30° regardless of the thickness of the segment. Once the central angle of about 30° is attained, any further increase in the number of segments will only increase the number of manufacturing steps and lower the tensile strength a cylindrical portion of the collet.

OBJECTS AND SUMMARY OF THE INVENTION

It is a principle object of the present invention to provide an improved collet of the type having independent gripping members molded in a rubber composition whereby the gripping strength of the collet is maximized.

A further object of the present invention is to provide a method for determining the design parameters for gripping jaws in a collet of the type having independent gripping jaws molded in a rubber composition.

It is also an object of the present invention to provide a collet having an optimized gripping strength which is compatible to conventional collet sizes and requirements and interchangeable with conventional split steel collets.

Yet a further object of the present invention is to provide a process for determining the ideal gripping jaw thickness and number of jaws to optimize the gripping strength of a collet design.

Still a further object of the present invention is to provide a design optimization tool for optimizing the design of a collet and which may be utilized on a personal computer.

And yet another object of the present invention is to provide a method for predicting collet torque slippage useful for maximizing a collet design.

It is also an object of the present invention to provide a collet torque slippage analysis method for determining the optimum characteristics or design parameters for a collet of specific dimensions and requirements.

Yet a further object of the present invention is to provide a collet torque slippage analysis method for determining the optimum parameters for the gripping jaws within the collet for a collet of conventional dimensions and requirements.

And still a further object of the present invention is to provide an analysis method for improving the gripping strength of the wide variety and sizes of conventional collets.

And yet another object of the present invention is to provide an analysis method for determining maximum collet torque for a collet configuration having predetermined design parameters, the method being useful in optimizing design parameters of the collet.

Still a further object of the present invention is to provide a system for optimizing collet design parameters, the system being useful in predicting optimum collet parameters to maximize gripping strength of the collet.

It is also an object of the present invention to provide a machine tool collet wherein at least one of the structural dimensions or characteristics of the gripping jaws of the collet is optimized for maximizing the gripping strength of the collet.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a method is provided for optimizing the gripping strength of a collet of the type having a plurality of gripping jaws spaced around a common axis with resilient material between the gripping jaws. The method according to the invention comprises the steps of determining the radial force of the gripping jaws upon a bar disposed through the collet, the radial force being dependent upon an axial force applied to the collet, and determining the torque developed on the bar from the radial forces of the gripping jaws just prior to a toggle condition occurring between the gripping jaws and the bar. The method further calls for determining the total moment force generated between the gripping jaws and the bar at toggle condition for a given toggle angle. According to the method of the invention, the toggle angle is varied until the total moment force between the gripping jaws and bar at toggle condition reaches a maximum value. The method further calls for determining the total torque on the bar from the torque prior to toggle and the maximum total moment force at toggle condition.

By employing the method of the present invention, an optimum design for a given collet configuration can be determined by varying parameters of the collet design and determining the total torque on the bar until a maximum torque value is determined for a given collet configuration.

The present method may be utilized in determining the optimum design for all known collet configurations, including the ER and TG collet configurations.

In a preferred embodiment of the method according to the present invention, the method includes the step of varying the thickness of the gripping jaws for a given collet configuration to determine the thickness of gripping jaw generating maximum total torque for a given collet configuration. Likewise, the method may include the step of varying the number of collet jaws for a given collet configuration to determine the number of gripping jaws generating maximum total torque for a given collet configuration. The method may further include the step of varying the jaw material, for example from steel to plastic, to determine the optimum material for maximizing gripping strength.

In further accordance with the purpose of the present invention, a method is provided for determining the optimum design for a given collet configuration and comprises the step of calculating the total torque generated on a bar passing through the collet of a given collet configuration having predetermined design parameters, the total torque including torque generated just prior to toggle occurring between the gripping jaws and the bar and the maximum moment force generated between the gripping jaws and the bar due to toggle. The method also calls for varying at least one design parameter of the collet and recalculating the total torque generated until the total torque generated reaches a maximum value for the given collet configuration.

In further accordance with the purpose of the invention, a system is provided for optimizing collet design parameters for a type collet having a plurality of gripping jaws spaced around a common axis with resilient material between the gripping jaws, whereby a bar passing through the collet is securely held by the gripping jaws. The system comprises means for variably inputting design parameters of the collet of a given configuration. Means are also provided for calculating the radial force of the collet gripping jaws upon the bar, the radial force being dependent upon an axial force applied to the collet through a collet holder and collet nut. Means are further provided for calculating the torque developed on the bar from the radial forces of the gripping jaws just prior to toggle between the gripping jaws and the bar. The system includes means for calculating the moment generated due to toggle between the gripping jaws and bar at a predetermined toggle angle. Means are provided for varying the toggle angle in the moment calculating means until the moment generated reaches a maximum value. The system also calls for means for summing the maximum moment at toggle and torque developed just prior to toggle to give a total torque developed on the bar by the gripping jaws for the inputted design parameters of the collet. In this way, the total torque developed on the bar can be maximized by varying at least one design parameter through the design parameter inputting means so that an optimum set of design parameters can be determined.

In a preferred embodiment of the system according to the invention, a computer is provided with the radial force calculating means, torque calculating means, moment calculating means, toggle angle varying means, and summing means comprising respective software executed by the computer. Preferably, the computer includes a library of known design parameters for various known collet configurations for use by the software. The means for variably inputting design parameters is interfaceable with the computer so that at least one of the design parameters of the collet can be varied. Preferably, the computer further includes a library of known parameters for various collet nut geometries, with the radial force calculating means using the collet nut parameters to compute axial force imparted to the collet.

Still in further accordance with the objects of the invention, a collet torque slippage analysis program is provided for calculating torque developed by a collet held by a collet nut and collet holder.

In further accordance with the invention, a machine tool collet which is actuated by engagement with a conical surface of a collet holder in a collet nut is provided. The machine tool collet comprises a resilient material for holding a plurality of gripping jaws in a desired spaced relation. The collet further includes gripping means for optimally holding a machine tool within the collet. The gripping means includes a plurality of gripping jaws held by the resilient material in a desired longitudinally and angularly spaced relation about the longitudinal centerline axis through the collet. The gripping jaws have an exposed inner face parallel to the centerline axis whereby the plurality of gripping jaws define an inner radius of the collet. The gripping jaws also have an angled or slanted exposed outer face whereby the plurality of gripping jaws defines a conical outer surface to engage the collet holder conical surface. The gripping jaws further comprise at least one structural dimension or characteristic, such as thickness, number, or material, optimized for maximizing the gripping strength of the collet.

In a preferred embodiment of the machine tool collet, the gripping jaws have a thickness optimized to maximize the gripping strength of the collet. Likewise, in another preferred embodiment, the gripping jaws are of a precise number optimized to maximize the gripping strength of the collet. The accompanying drawings, which are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
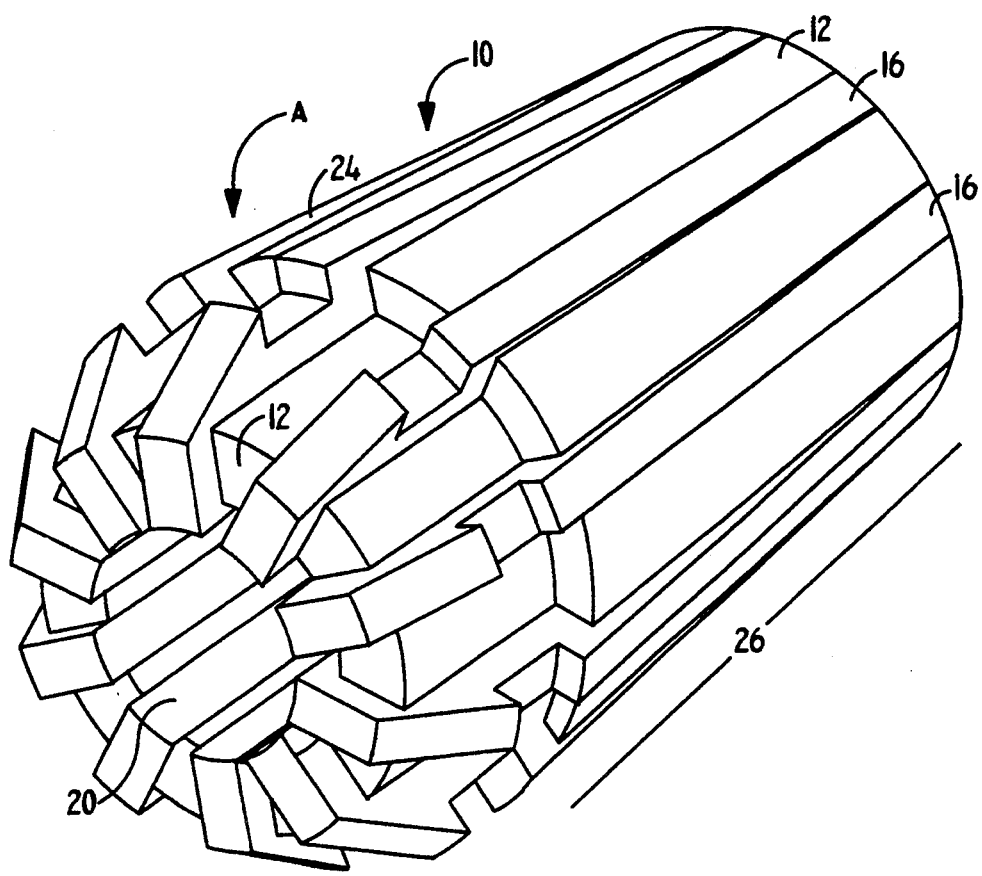
FIG. 1 is a perspective view of a collet according to the present invention, particularly a collet formed according to the process and method of the invention.

Reference will now be made in detail to the presently preferred embodiments of the invention, one or more examples of which are illustrated in the accompanying drawings and figures. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment of the method of the invention, can be used on another embodiment of the method to yield a still further embodiment of the method. Thus, it is intended that the present invention cover such modifications and variations as come within the scope of the appended claims and their equivalents. The numbering of components in the drawings is consistent throughout the application, with the same components having the same number in each of the drawings.

Figure 2:
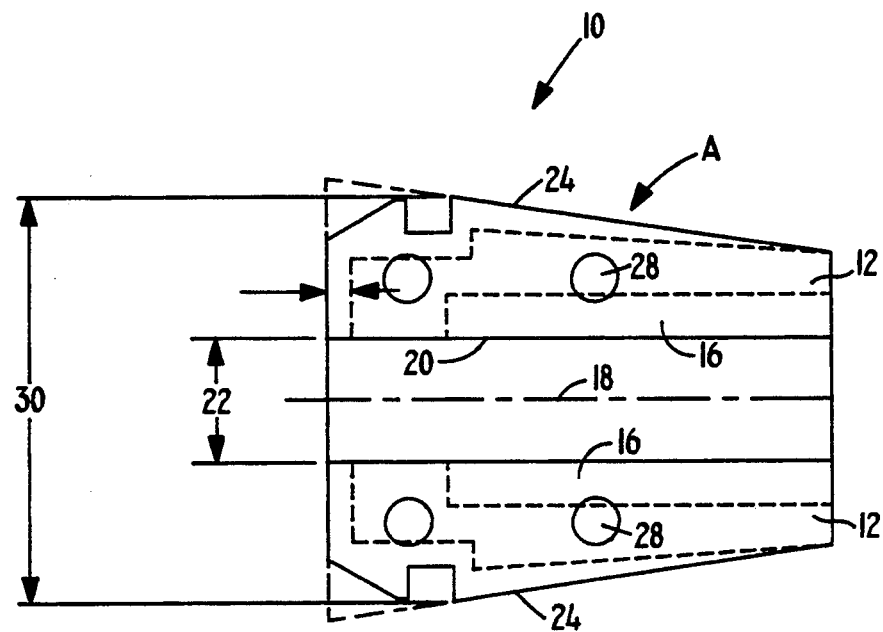
FIG. 2 is a partial component view of the collet depicted in FIG. 1, particularly illustrating the gripping jaws of the collet.
Figure 3:
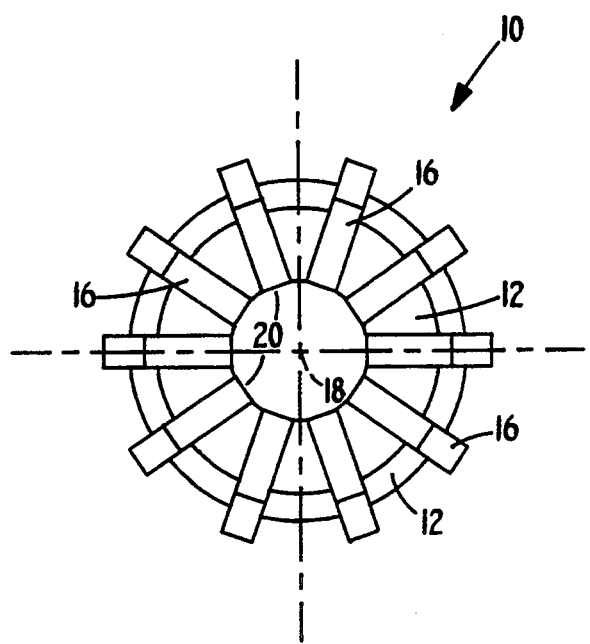
FIG. 3 is a front end view of the collet shown in FIG. 2.

The method and apparatus according to the present invention relate to a collet of the type illustrated in FIGS. 1 through 3. Collet 10 is actuated by engagement with the conical surface of a collet holder and collet nut (not shown). Those skilled in the art understand the operation of collet 10 with a collet holder and collet nut.

Collet 10 comprises resilient material 12 for holding a plurality of gripping jaws 16 in a desired spaced relation relative to each other. Preferably, resilient material 12 extends through perforations 28 within gripping jaws 16 so as to form essentially concentric rings of resilient material 12 through gripping jaws 16.

Collet 10 also comprises gripping means A for optimally holding a machine tool within collet 10. In a preferred embodiment, gripping means A comprises a plurality of gripping jaws 16 held by the resilient material 12 in a desired longitudinally and angularly spaced relation about longitudinal centerline axis 18 through collet 10. The gripping jaws have an exposed inner face 20 parallel to centerline axis 18, whereby the plurality of jaws 16 define an inner radius 22 of collet 10. The shaft or bar of a machine tool to be held by collet 10 is inserted through inner radius 22 of collet 10.

Gripping jaws 16 further include an angled exposed outer face 24 whereby the plurality of jaws 16 define a conical outer surface 26. Conical outer surface 26 matches the conical surface of the collet holder (not shown).

According to the method and process of the invention described in this section, applicant has determined that the gripping strength of the present collet is significantly increased compared to conventional collets by analyzing the torque generated by the collet on the machine tool or a test bar and optimizing the design parameters of gripping jaws 16 so as to generate maximum torque for a given collet configuration. Thus, gripping jaws 16 comprise at least one structural characteristic or dimension optimized to maximize the gripping strength of collet 10. The structural characteristics or dimension of jaws 16 may include, for example, the thickness of jaw 16, the number of jaws 16 within collet 10, or the type of material from which jaw 16 is formed. For example, a standard ER25 collet configuration has collet geometries based on DIN standards, such as inner radius, outer radius, angle of outer conical surface, etc. Once a particular collet configuration is selected, the industry standards and requirements are basically dictated by the appropriate engineering standards. However, applicants have determined that by optimizing certain design parameters of the collet gripping jaws, the gripping strength of a collet of that particular configuration can be maximized.

Applicant has also particularly determined that a degree of toggle between the gripping jaws and machine tool or bar is desirable in that it provides a maximum torque generated between the collet jaws and bar. Applicant has incorporated this desirable condition in his analysis in determining the optimum design parameters for the gripping jaws for maximizing total torque between the collet and tool held within.

Figure 4:
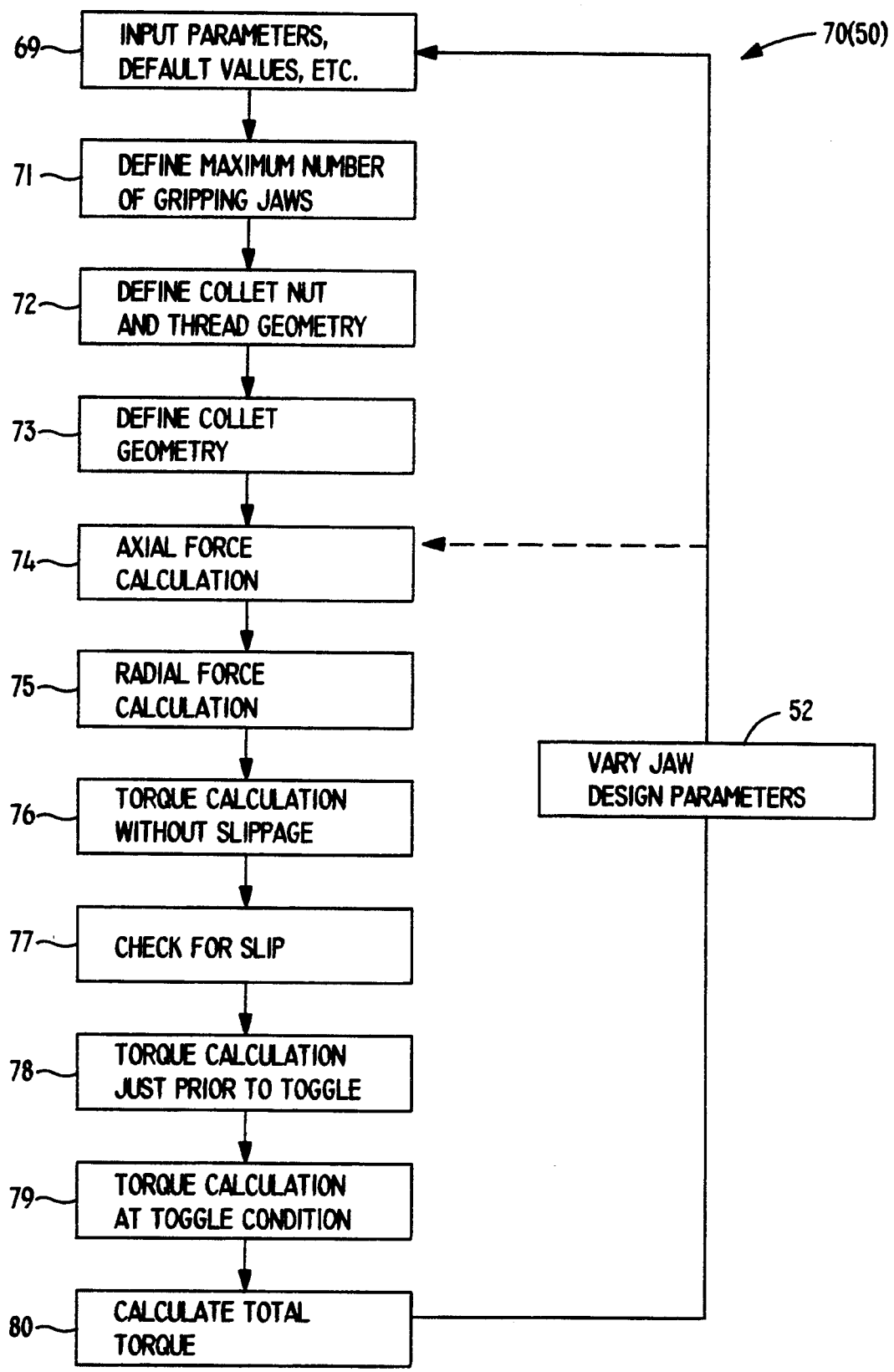
FIG. 4 is a flow chart diagram depicting the sequence of steps and calculations according to the method and process of the invention.
Figure 5:
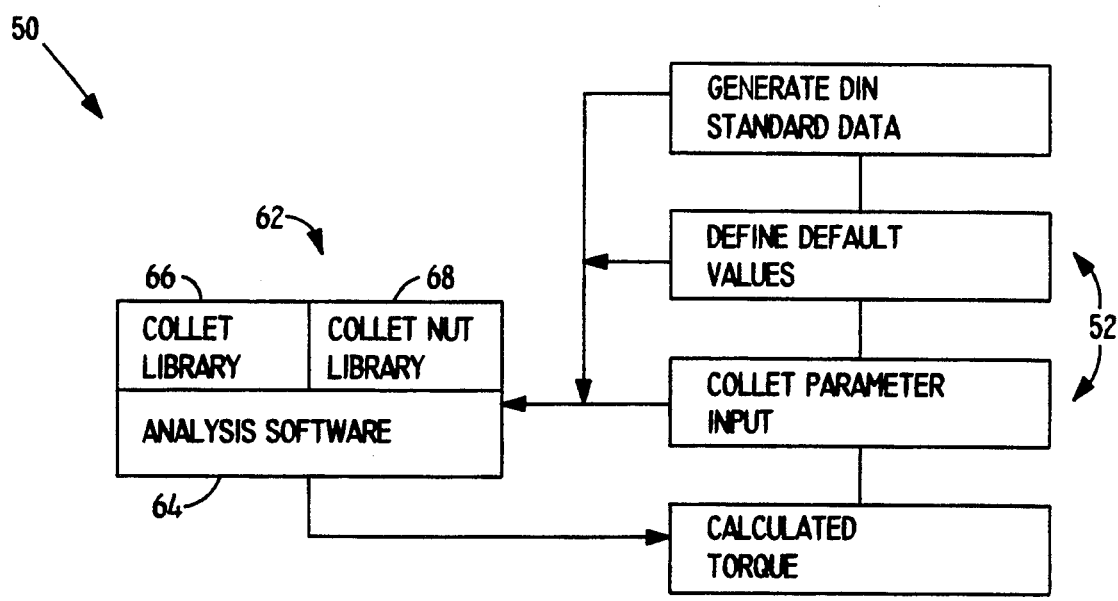
FIG. 5 is a simplified schematic representation of the system according to the invention incorporating the process and method of FIG. 4.
Figure 6:
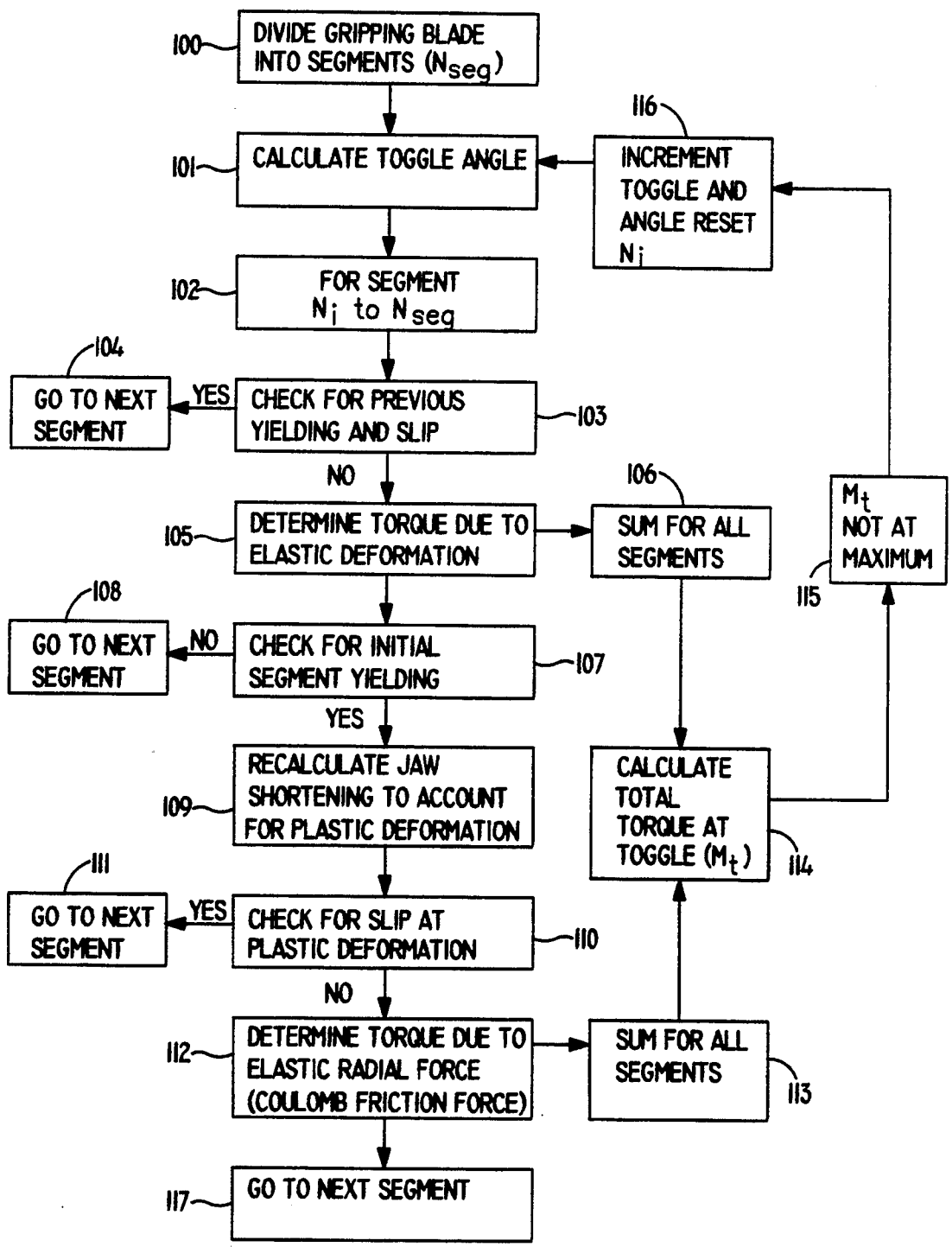
FIG. 6 is a flow chart diagram depicting the steps and calculations according to the method for calculating torque at toggle condition.

The method and system for implementing the same according to the invention is represented generally in flow chart form in FIGS. 4 to 6. The analysis steps indicated in the figures will be discussed in detail below. Table 1 provided below is a list of the variables and their meaning and default value used in the analysis steps.

TABLE 1

| Analysis Variable | Program Variable | Variables Default Value | Meaning |
| --- | --- | --- | --- |
| $T_{nut}$ | TN | Input | Torque applied to nut |
| W | W | (Calculated) | Resulting axial force |
| $W_{jaw}$ | WJAW | (Calculated) | Resulting axial force per jaw |
| $r_m$ | RM | Input | Thread mean radius |
| $r_c$ | RC | Input | Collet bearing radius ($l_{11}$ of Table 4 of DIN 6499) |
| $f_n$ | FN | 0.15 | Friction coef. for nut threads |

TABLE 1-continued

| Analysis Variable | Program Variable | Variables Default Value | Meaning |
|---|---|---|---|
| $f_{cb}$ | FCB | 0.15 | Friction coef. for collet thrust bearing |
| $f_c$ | FC | 0.15 | Friction coef. for jaw/holder interface |
| $f_b$ | FB | 0.15 | Friction coef. for bar/jaw interface |
| $\alpha_n$ | | (Calculated) | Thread tooth angle (normal to thread) |
| $\alpha$ | AM2, ALPHAN, TANGLE | 30. | Thread tooth angle (through screw axis) |
| $\lambda$ | ALAMB | (Calculated) | Lead or helix angle |
| $p_m$ | PM | Input | Thread pitch (h of Table 1 of DIN 6341) |
| $\alpha_c$ | AC, ALPHAC | 8. | Angle of collet |
| $F_{radial}$ | FYJ | (Calculated) | Radial Force on bar |
| $F_{radial}^{jaw}$ | FYJ | (Calculated) | Radial Force on bar per jaw |
| $(F_{radial}^{jaw})_i$ | FYJOB | $F_{radial}/N_{seg}$ | Radial Force on bar per jaw per segment |
| $T_{CF}^{jaw}$ | TJ | (Calculated) | Resulting torque per jaw due to friction |
| $N_{jaws}$ | N | Input | Number of jaws |
| $T_{CF}^{total}$ | TTJ | $N_{jaws} T_{CF}^{jaw}$ | Total torque for all jaws due to friction |
| $R_b$ | RB | Input | Radius of bar |
| $t$ | T | Input | Jaw thickness |
| $h_1$ | H1 | (Calculated) | Width of jaw at front of collet |
| $h_i$ | HI | (Calculated) | Jaw width at ith segment |
| $R_{c1}$ | RC1 | Input | Outer radius of front of collet (.5 $d_2$ of Table 3 of DIN 6499) |
| $(R_c)_i$ | RCI | (Calculated) | Average outer radius of collet at ith segment |
| $R_a$ | RA | Input | Outer radius of back of collet (.5 $d_{11}$ of Table 3 of DIN 6499) |
| $R_c^{inner}$ | RIC | Input | Inner radius of collet |
| $N_{seg}$ | NSEG | 20 | Number of segments along jaw length |
| $b$ | B | (l cos $\alpha_c$)/$N_{seg}$ | Segment length |
| $l$ | AL | Input | Engagement length of collet and collet holder |
| $L_{bar}$ | LBAR | Input | Engagement length of jaw and bar |
| $\theta$ | THETA | (Calculated) | Bar rotation angle |
| $\Delta\theta$ | DTHETA | (Calculated) | Increment in toggle or bar rotation angle |
| $\theta_{max}^i$ | THETLM | (Calculated) | Maximum rotation angle for ith segement |
| $E_{jaw}$ | EJAW | 30.E + 06 | Young's modulus of jaw material |
| $\nu_{jaw}$ | NUJ | 0.3 | Poisson's ratio of the jaw material |
| $E_{bar}$ | EBAR | 30.E + 06 | Young's modulus of bar material |
| $\nu_{bar}$ | NUB | 0.3 | Poisson's ratio of the bar material |
| $(\sigma^{bear})_{all}$ | BEARAL | 350000. | Allowable bearing stress of jaw material |
| $(\sigma_n^{bear})_i$ | SIGMA | (Calculated) | Bearing stress at blade corner for ith segment |
| $(F_{radial})^0$, $(F_{radial})^m$ | FPY | (Calculated) | New radial force for segment and each iteration m |
| $x_i$ | XI | (Calculated) | Moment arm for ith segment m |
| $M_T^{jaw}$ | MTJ | (Calculated) | Moment per jaw due to toggle only |
| $M_T^{total}$ | MT | $N_{jaws}M_T^{jaw}$ | Total moment due to toggle only |
| $T_{JPT}^{jaw}$ | TWOT | (Calculated) | Torque per jaw just prior to toggle |
| $T_{JPT}^{total}$ | MTWOT | $N_{jaws}T_{JPT}^{jaw}$ | Total torque just prior to toggle |
| $T_T^{total}$ $M_T^{total}$ | TT | $T_{JPT}^{total} +$ | Total torque including toggle |
| $a$ | SCW | (Calculated) | Semi-contact width for Hertz contact |
| $t_{coat}$ | TCOAT | .002 | Wetted-surface coating thickness of rubber |

It should be understood that the following description of the analysis steps according to the method and process of the present invention is but a preferred embodiment of the present method and not meant as a limitation thereof. The values calculated in the steps may be calculated or predicted in any manner of process, all of which fall within the scope and spirit of this invention. Additionally, the order of analysis steps presented is not limited to the order discussed but, can include any effective order.

Referring to FIG. 4, the various collet parameters and default values are entered at step 69, including collet holder and nut parameters, jaw design variables, material allowable stresses, coefficient of friction for collet nut, holder, and bar, test bar parameters, etc. At step 71 the maximum number of gripping jaws is determined for a given collet configuration and given jaw thickness. The maximum number of jaws is estimated using the inner radius of the collet, the jaw thickness, and the rubber coating thickness on each side of the jaw as follows:

$$(N_{jaws})_{max} = \text{Integer}\left(\frac{2\pi R_c^{inner}}{t + 2t_{coat}}\right)$$

Although not used particularly in the analysis, the angle of resilient material 12 between the jaws may be calculated assuming a uniform equal spacing between the jaws and a uniform resilient material coating thickness on each jaw face according to the following equation:

$$\theta_{rubber} = \frac{2\pi}{N_{jaws}} - \frac{t + 2t_{coat}}{R_c^{inner}}$$

Figure 7A:
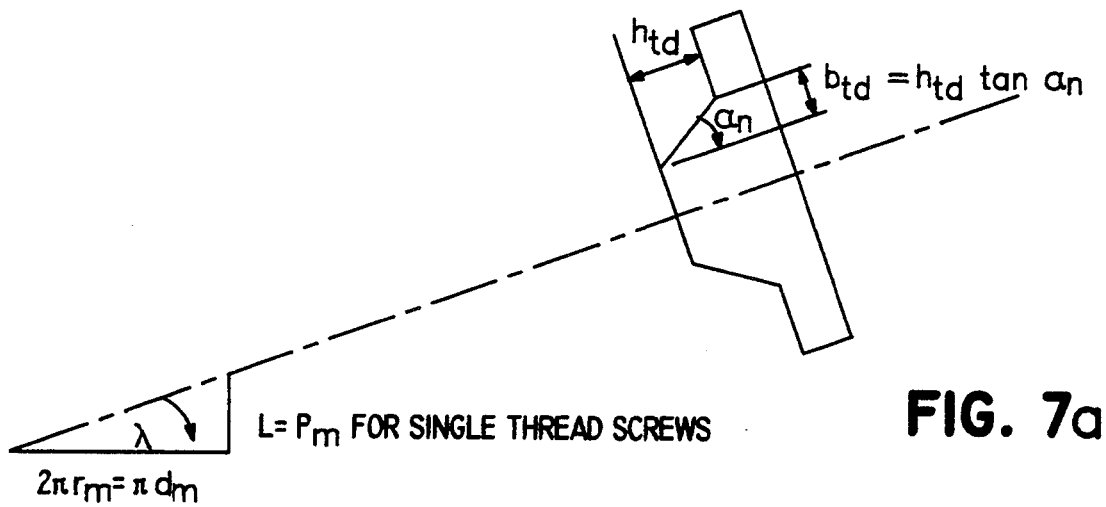
FIGS. 7a and 7b are diagrammatic depictions of collet thread geometries, particularly depicting the analysis parameters used in calculation of axial force.
Figure 7B:
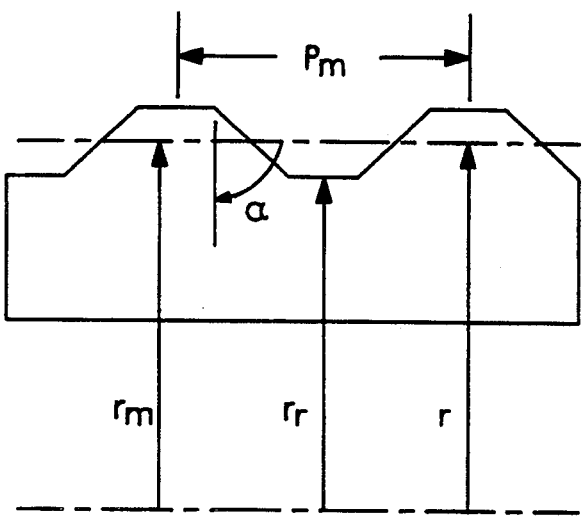

As discussed above, the collet 10 is engaged with a collet holder and collet nut (not shown in the figures). Engagement between the collet nut and collet holder imparts an axial force to the collet. As a result of this axial force, a radial force is developed between each jaw 16 and a test bar or machine tool shaft through the collet. The axial force or thrust developed due to tightening of the collet nut onto the collet holder is dependent upon the geometry of the threaded surfaces of the collet nut. The notation for this geometry is indicated in FIGS. 7a and 7b. The thread geometry parameters may be obtained from engineering standards, such as the June, 1959 DIN 6341 standard (TR designation) or ISO 68 metric screw thread standard (H designation). The values for the collet nut thread geometry parameters obtained or calculated from the engineering standards are preferably stored in a library 68 for later retrieval and analysis.

At step 73, the parameters for a particular collet configuration are defined, preferably from stored in formation in a library 66 (FIG. 3). The collet geometry parameters are based on DIN standards and are basically defined once a particularly collet configuration is selected. The analyst is prompted to select a particular collet design or configuration and the system or program then defines the various geometric data needed for the analysis. For example, table 2 is provided below as an example of collet geometry standards obtained from DIN 6499 for an 8° cone for an ER11, ER25, ER32, and ER40 collet designation.

TABLE 2

Collet Geometry Standards from DIN 6499 (8-degree Cone).

| Collet Design | $d_2 =$ $2R_{c1}$, mm | $d_5 =$ $2R_{top}$, mm | $d_{11} =$ $2R_a$, mm | $l_t =$ $L_{bar}$, mm | $l_3$, mm | $l_4$, mm | $l_{11} = R_c$, mm |
|---|---|---|---|---|---|---|---|
| ER11 | 11.0 | 9.5 | 7.5 | 18.0 | 2.0 | 2.5 | 5.0 |
| ER25 | 25.0 | 22.0 | 18.0 | 34.0 | 2.5 | 5.0 | 11.5 |
| ER32 | 32.0 | 29.2 | 23.5 | 40.0 | 2.7 | 5.5 | 14.9 |
| ER40 | 40.0 | 36.2 | 30.5 | 46.0 | 3.5 | 7.0 | 18.5 |

The axial force calculation is executed at step 74. The total torque applied to the collet nut on the collet holder equals the sum of the torque necessary to develop an axial thrust on the collet and the torque necessary to overcome the collet thrust bearing friction. The applied torque to the collet nut is given by the equation:

$$T_{nut} = W r_m \left( \frac{2\pi r_m f_n + L\cos a_n}{2\pi r_m \cos a_n - f_n L} \right) + f_{cb} W R_c$$

If the term inside the parenthesis is defined as:

$$\frac{1}{\Omega} = \left( \frac{2\pi r_m f_n + L\cos a_n}{2\pi r_m \cos a_n - f_n L} \right)$$

then using the relationship for tan λ, the inverse relation is obtained:

$$\Omega = \left( \frac{1 - \frac{f_n}{\cos a_n} \tan\lambda}{\tan\lambda + \frac{f_n}{\cos a_n}} \right)$$

As such, the expression for the applied torque to the nut may be written as:

$$T_{nut} = W \frac{r_m}{\Omega} + W f_{cb} R_c = W r_m \left( \frac{1}{\Omega} + f_{cb} \frac{R_c}{r_m} \right)$$

then solved for the axial force on the entire collet W to obtain:

$$W = \frac{T_{nut}}{r_m \left( \frac{1}{\Omega} + f_{cb} \frac{R_c}{r_m} \right)}$$

Now assuming that only the jaws carry any load and that each jaw is identical and located ideally so that each jaw is loaded in the same manner and in the same amount. That is, the axial force per jaw is:

$$W^{jaw} = \frac{W}{N_{jaws}}$$

It should be understood that the above calculations are but one means of predicting the axial force applied to the collet. The axial force may actually be predetermined and stored in an appropriate library for retrieval and analysis.

The radial force calculation is performed at step 75. As a result of the axial force which develops due to the tightening of the collet nut, a normal force develops between the collet holder surface and each gripping jaw. The total frictional force between the collet jaws and collet holder is the product of this normal force and the coefficient of friction between the jaws and collet holder. That is, $$F_f{}^{jaw} = f_c F_{ya}{}^{jaw}$$

Summing forces in the axial and radial directions gives the following two equations in two unknowns:

$$\uparrow \Sigma F_{axial} = f_b F_{radial}^{jaw} - W^{jaw} + F_{ya}^{jaw} \sin a_c + f_c F_{ya}^{jaw} \cos a_c = 0$$

$$\rightarrow \Sigma F_{radial} = F_{radial}^{jaw} - F_{ya}^{jaw} \cos a_c + f_c F_{ya}^{jaw} \sin a_c = 0$$

From these two equations, expressions for the normal force between the collet holder and each jaw, for the radial force transmitted between each jaw and the bar, and for the axial force are obtained and given by:

$$F_{ya}^{jaw} = \frac{W^{jaw}}{(f_b + f_c)\cos a_c + (1 - f_b f_c)\sin a_c}$$

$$F_{radial}^{jaw} = F_{ya}^{jaw} (\cos a_c - f_c \sin a_c)$$

$$F_{axial}^{jaw} = F_{ya}^{jaw} \sin a_c$$

In step 76, the torque due to Coulomb friction force per each gripping jaw is calculated for the condition of no slippage between the bar and gripping jaws. Slippage is essentially the condition where the gripping jaws have "rocked" to such a degree that they are basically no longer applying force to the test bar which therefore is essentially free to rotate within the collet. The radial force transmitted between the jaws and the test bar has associated frictional forces that develop at the inner face between each jaw and the bar. The torque due to the Coulomb friction force per jaw is calculated as follows:

$$T_{CF}{}^{jaw} = F_f{}^{jaw} R_b = f_b F_{radial}{}^{jaw} R_b$$

The total torque developed without slippage is this value times the number of jaws in the collet, according to the following:

$$T_{CF}{}^{total} = N_{jaws} T_{CF}{}^{jaw} = N_{jaws} F_f{}^{jaw} R_b = N_{jaws} f_b F_{radial}{}^{jaw} R_b$$

The torque results from the frictional forces acting between the bar and each jaw edge. The frictional force is calculated based on Coulomb's Law of Friction which is independent of contact area. As such, in this part of the analysis, the thickness of the jaw and the engagement length along the inner face between the bar and jaw edges do not effect the torque resulting from Coulomb friction forces.

At step 77, it is predicted whether slip will occur between the test bar and the jaws based on the geometry of the jaws. Slip will occur when:

$$\tan a_1 > f_b$$

where $$a_1 = \tan^{-1}\left(\frac{t}{h_1}\right) = \tan^{-1}\left(\frac{t}{R_{c1} - R_b - \delta_{clear}}\right)$$

It is desired to inform the analyst whether the parameters for the jaw blade he has selected will result in slipping between the jaw blades and test bar.

Figure 8A:
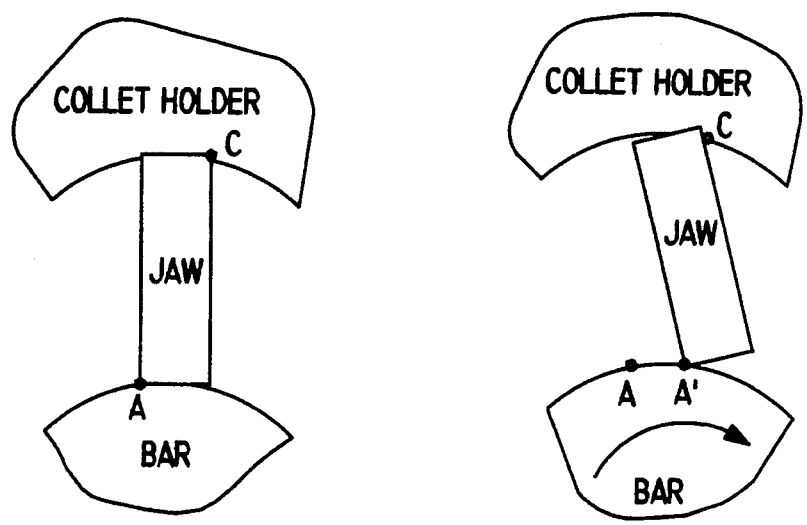
FIG. 8a is a simplified component view of a gripping jaw cooperating with a collet holder to grip a bar, particularly illustrating the condition of toggle.

As illustrated in FIG. 8a, at some degree of slipping between the jaws and bar, the jaw will "toggle" or "rock" and lose contact with the bar and collet holder at certain points along the length of the jaw. At toggle condition, the contacting surface area will be reduced. A degree of toggling between the jaws and bar may be desired in that torque developed between the jaws and bar is actually increased.

Figure 8B:
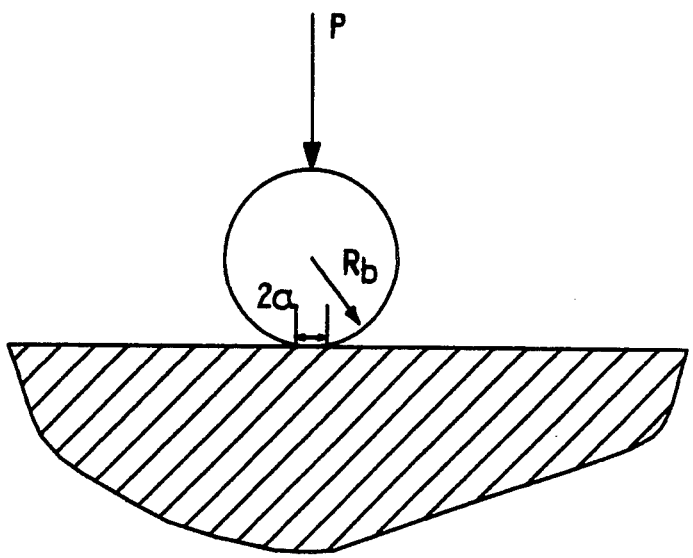
FIG. 8b is a diagram illustrating the contact width between a jaw and the bar.

To account for differences due to geometric parameters of the jaws, such as jaw thickness, in the torque calculation, the conditions "just prior" to toggle are examined according to all elastic contact analysis (Hertzian Contact Analysis). Basically, the test bar is treated as a long cylinder in contact with a flat semi-infinite plane subjected to a line of force P as shown in FIG. 8b. The contact region between the cylinder and plane is equal to twice the semi-contact width (2a) for the entire cylinder length. The semi-contact width (a) is calculated according to the following:

$$a = \sqrt{\frac{4PR_b}{\pi E^*}}$$

where $$E^* = \left(\frac{1 - v_{bar}^2}{E_{bar}} + \frac{1 - v_{jaw}^2}{E_{jaw}}\right)^{-1}$$

$$P = \frac{F_{radial}^{jaw}}{L_{bar}}$$

This approach is valid as long as the jaw thickness is much larger than twice the semi-contact width.

Figure 9:
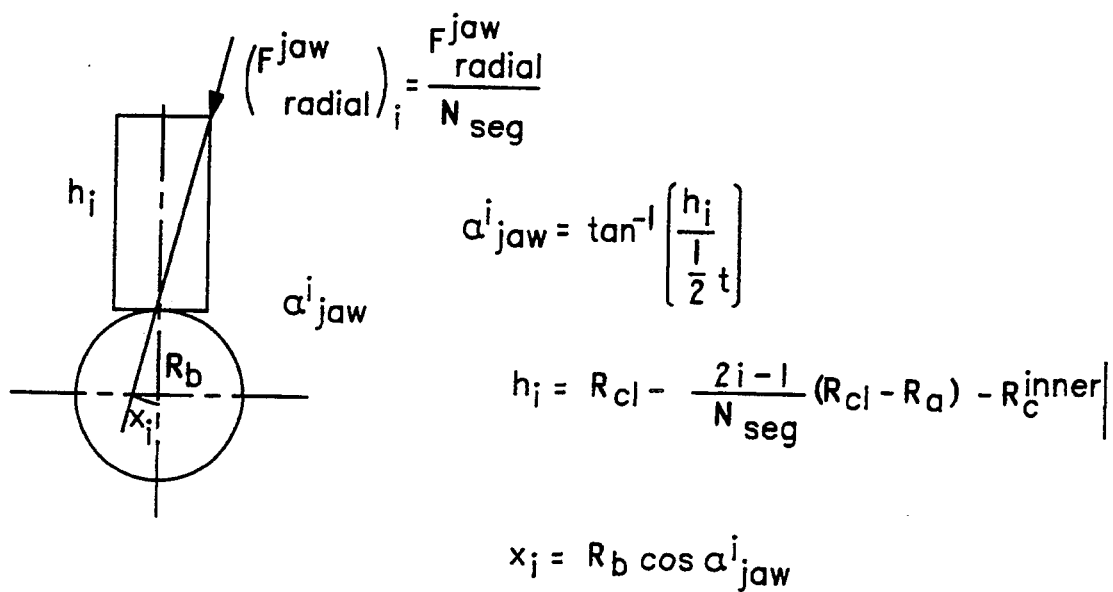
FIG. 9 is a diagrammatic sketch particularly pointing out the analysis parameters used to calculate torque just prior to toggle.

In step 78 according to the present method, torque is calculated at a condition just prior to toggle between the jaws and bar. As illustrated in FIG. 9, just prior to toggle occurring, the line of action of the radial force shifts to the outer corner of each jaw. Since the depth of the jaw varies along the engagement length thereof, the distance or height of the segment must be calculated. The engagement length between the jaw and the collet holder is projected onto the bar and then this length is divided into a number of segments ($N_{seg}$) which may be set at default value such as 20. Then, by summing forces in the radial and tangential directions and summing moments about the center of the bar, the torque just prior to toggle for each segment is obtained. Summing these values for each segment gives the total torque just prior to toggle for each jaw. This approach gives the following equations:

$$T_{JPT}^{jaw} = \sum_{i=1}^{N_{seg}} ((F_{radial}^{jaw})^i R_b(f_b + \cos a_{jaw}^i(\sin a_{jaw}^i - 1)))$$

$$= T_{CF}^{jaw} + \sum_{i=1}^{N_{seg}} ((F_{radial}^{jaw})^i R_b \cos a_{jaw}^i(\sin a_{jaw}^i - 1))$$

The total torque developed just prior to toggle is this value times the number of jaws in the collet, according to the following:

$$T_{JPT}^{total} = N_{jaws} T_{JPT}^{jaw}$$

Method 70 further includes step 79 for calculating torque at toggle condition between the jaws and bar. The torque calculation at toggle condition analysis is charted in detail in FIG. 6. Since the toggle may not extend along the full length of each jaw, the jaw is divided at step 100 into a number of segments $N_{seg}$ along the length thereof. The calculations proceed as a double loop. For each increment in bar rotation, or "toggle angle," the elastic deformation for each segment of a jaw is computed as well as its radial frictional force.

Figure 10:
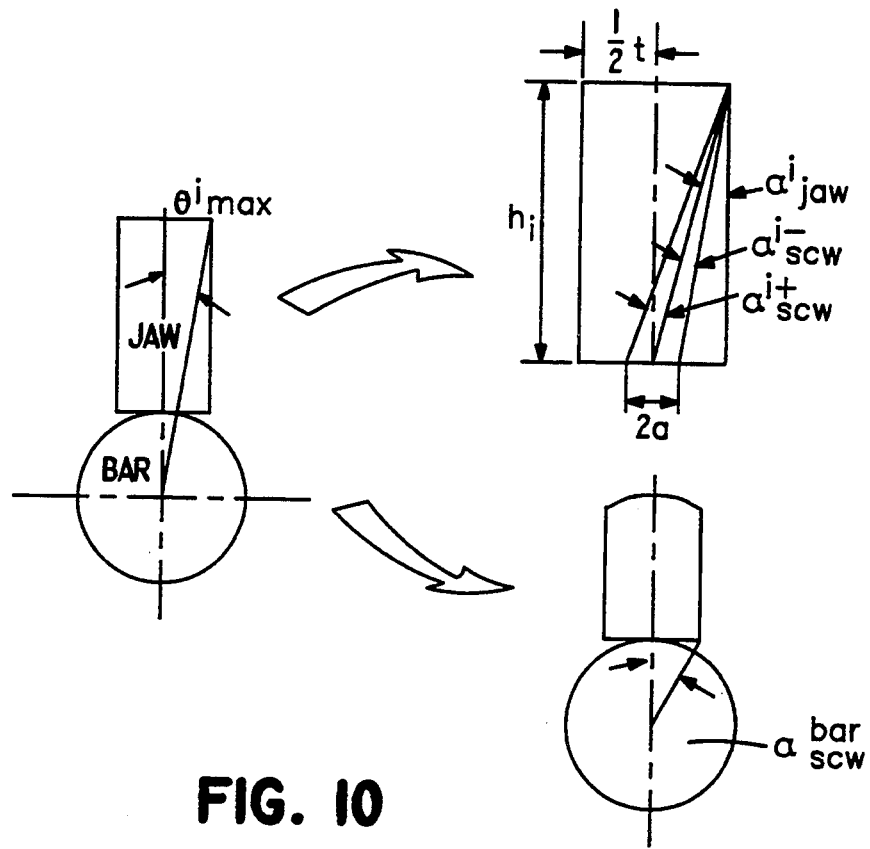
FIG. 10 is another simplified diagrammatic sketch illustrating the concept of roll angle and maximum roll angle used in calculation of torque at toggle condition.
Figure 11A:
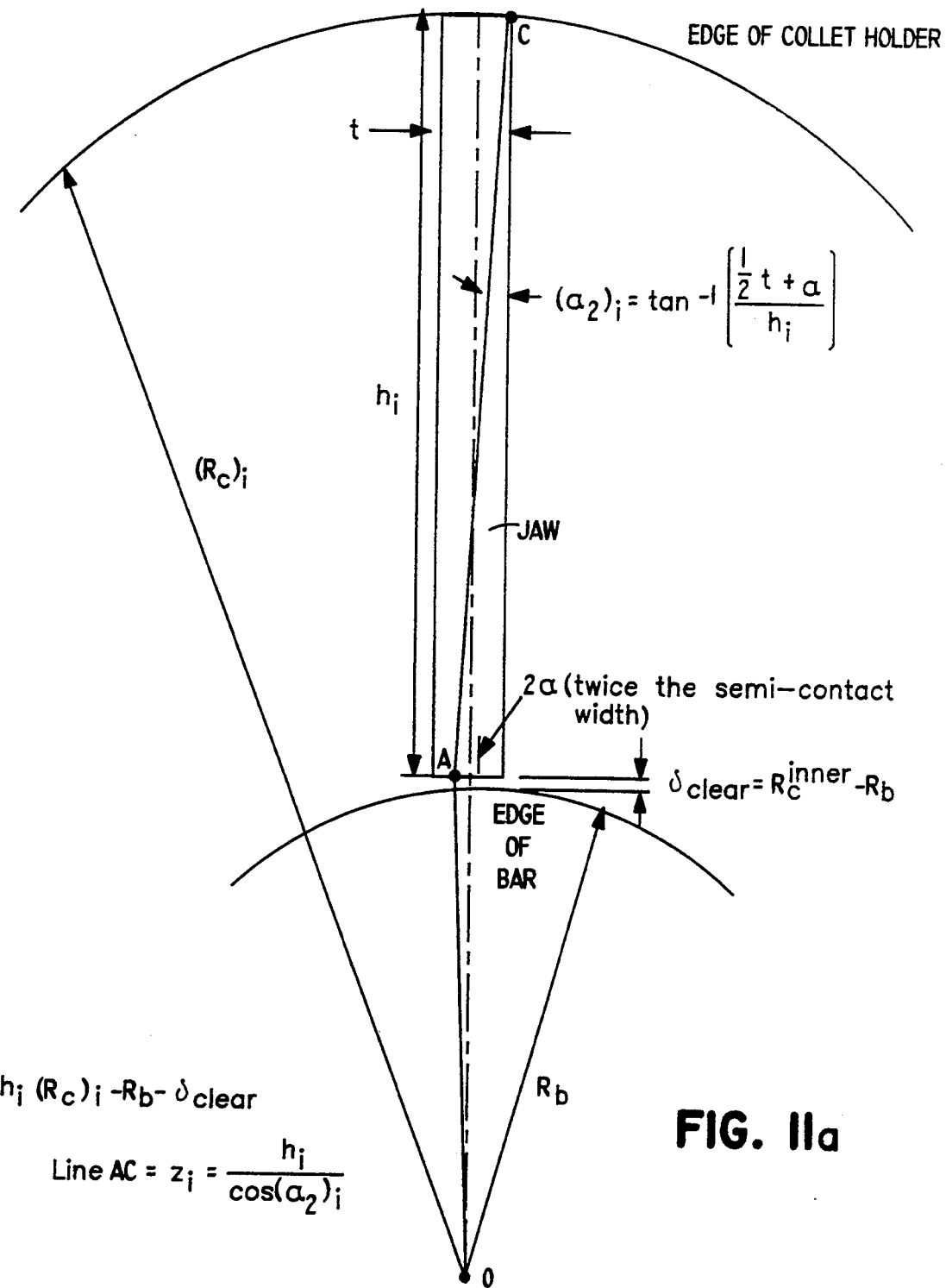
FIG. 11a is a detailed diagrammatic sketch illustrating the analysis variables used in the calculation of torque at toggle condition.
Figure 11B:
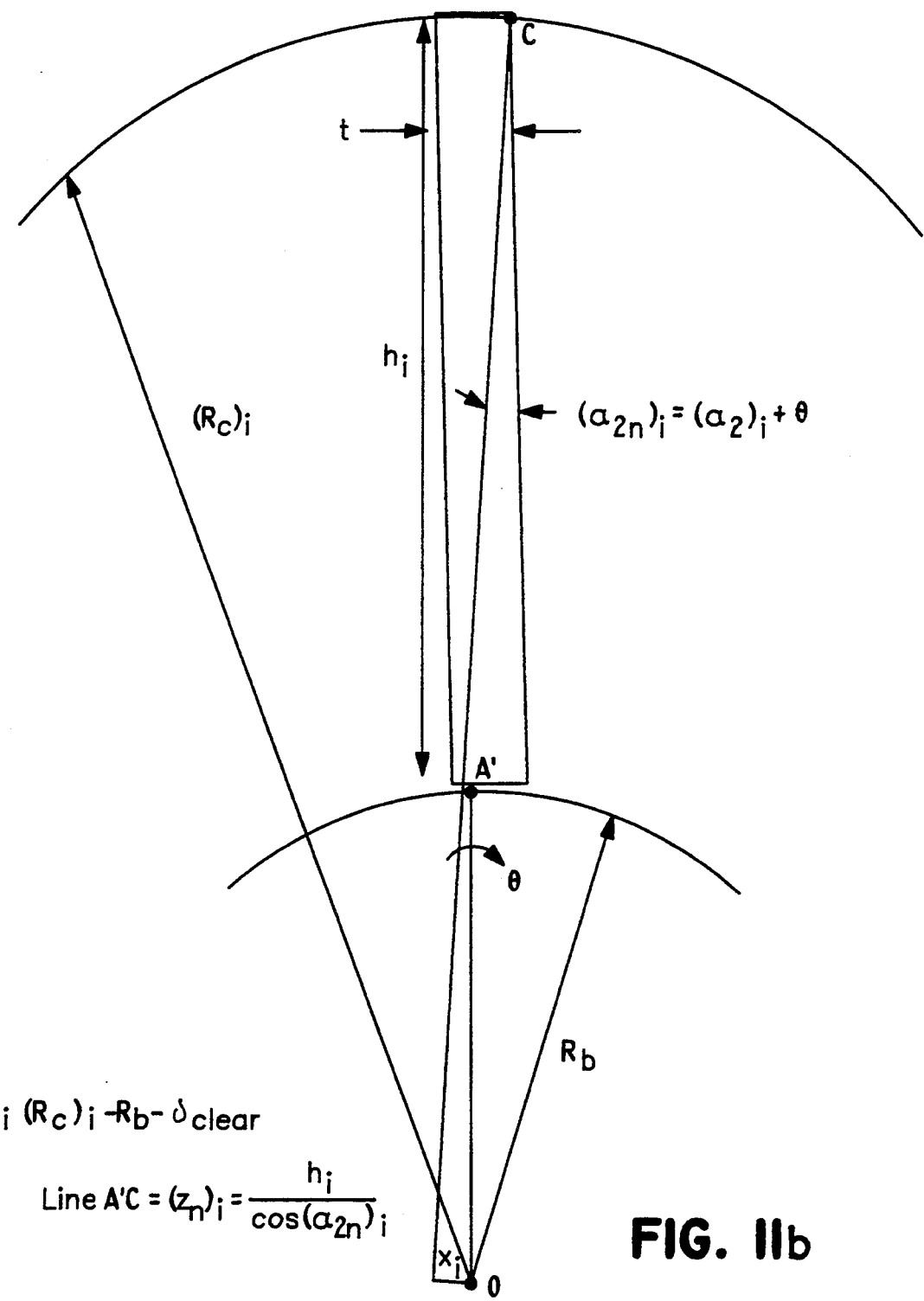
FIG. 11b is a similar to FIG. 11a and shows the parameters used in elastic deformation toggle analysis.

At step 101, the toggle angle for each jaw is determined. As shown in FIG. 10, the toggle angle is calculated based on the semi-contact width obtained from the Hertz contact analysis. The toggle angle is the angle through which a jaw can rotate within the distance defined by the semi-contact width. The toggle angle is calculated as follows:

$$a_{jaw}^i = \tan^{-1}\left(\frac{\Delta t}{h_i}\right) \qquad a_{scw}^{bar} = \tan^{-1}\left(\frac{a}{R_b}\right)$$

$$a_{scw}^{i-} = a_{jaw}^i - \tan^{-1}\left(\frac{\Delta t - a}{h_i}\right) \quad a_{scw}^{i+} = a_{jaw}^i - \tan^{-1}\left(\frac{\Delta t + a}{h_i}\right)$$

It is assumed that the initial toggle angle and subsequent increment of toggle angle are equal, in other words, the toggle angle will be incremented each pass by its initial value. It should be understood that there is a limit for the toggle angle above which no torque will be generated.

The torque at toggle condition analysis and calculations will be discussed in detail below but, basically, the torque at toggle accounts for the torque generated due to elastic deformation of the jaws and torque due to elastic radial (Coulomb friction) force once the jaw edge has "yielded." Thus, the analysis considers plastic deformation of the jaws as well. It should be understood that the type of material from which the jaws are formed will thus effect the torque at toggle analysis since yielding or plastic deformation is a factor of the allowable stress for the type material. Material composition of the jaws is thus a design parameter of the jaws which can be varied to optimize the gripping strength of the collet.

The following analysis of the torque calculation at toggle condition is represented sequentially in flow-chart form in FIG. 6. Once the jaw has been segmented at step 100 and the toggle angle calculated at step 101 as above, the analysis is executed for each segment. Although the calculations will be explained in detail below, the basic steps are as follows. At step 103, the segment $N_i$ is checked for previous yielding and slip. If such occurred, this segment is ignored at 104 and the next segment analyzed, and so forth. If yielding and slip did not occur, the torque for the segment due to elastic deformation is calculated at 105. This torque is summed for all segments at 106. At step 107, the segment is checked for initial yielding. If such has not occurred, then no more torque is being generated and, at 108, the analysis skips to the next segment. If yielding has occurred, the jaw shortening is recalculated at step 109 to account for plastic deformation. Then, at step 110, slip is checked at the plastic deformation condition. If slip occurs, no torque is generated and the analysis skips to the next segment at step 111. If slip does not occur, the torque generated due to elastic radial force (Coulomb force) at the yielded condition is calculated at step 112. This torque is summed for all the segments at step 113. The next segment is analyzed at step 117.

At step 114, the total torque at toggle condition is calculated for all jaws from the sums of step 113 and 106. If this total torque is not a maximum valve at 115, then at 116 the toggle angle is incremented at the analysis repeated for that segment. The total torque at toggle condition is not a maximum if it is less than the previous value, the previous value therefore being the maximum value.

The calculations and instructions for executing the steps just described are as follows:

Initialize variables IPASS=0, $IYLD_i$=0 for all segments

Increment the bar rotation angle $\theta = \theta + \Delta\theta$ where initial value of $\theta = \alpha_{scw}^{bar}$ and $\Delta\theta = \alpha_{scw}^{bar}$, and set IPASS=IPASS+1

Calculate the length of each segment along the jaw length assuming uniform spacing $b = l/N_{seg}$ where l is the engagement length of the collet and collet holder.

Calculate $$\Delta t = \tfrac{1}{2}t - a - R_b\theta$$

For each segment $i=1, N_{seg}$, first check to see if $IYLD_i$ is less than zero. If it is, then this jaw segment is not in contact with the bar and so go to the next segment. If it is greater than or equal to zero then proceed. Set the iteration counter for segment yielding to zero (m=0) and do the following calculations:

Average outer radius of collet for the $i^{th}$ segment $$(R_c)_i = R_{c1} - \frac{(2i-1)}{2N_{seg}}(R_{c1} - R_a)$$

Width of jaw at the $i^{th}$ segment $h_i = (R_c)_i - R_b - \delta_{clear}$ where $\delta_{clear} = R_c^{inner} - R_b$ Calculate the roll angle for the $i^{th}$ segment $$\theta_{roll}^i = a_{scw}^{i+} = \tan^{-1}\left(\frac{\tfrac{1}{2}t + a}{h_i}\right) - \tan^{-1}\left(\frac{\tfrac{1}{2}t}{h_i}\right)$$

Calculate the maximum rotation angle for the $i^{th}$ segment $$\theta_{max}^i = \tan^{-1}\left(\frac{\tfrac{1}{2}t}{h_i + R_b}\right)$$

If $\theta \geq \theta_{max}^i$ then go to the next segment.

Angle between line AC and right edge of jaw (before toggle) for $i^{th}$ segment $$(\alpha_2)_i = \tan^{-1}\left(\frac{t}{h_i}\right)$$

Length of the line AC for the $i^{th}$ segment before toggle $$z_i = \frac{h_i}{\cos(\alpha_2)_i}$$

Angle between line A'C and right edge of jaw (after toggle) for $i^{th}$ segment $$(\alpha_{2n})_i = (\alpha_2)_i + \theta$$

Length of the line A'C for the $i^{th}$ segment after toggle $$(z_n)_i = \frac{h_i}{\cos(\alpha_{2n})_i}$$

Shortening of this diagonal line for the $i^{th}$ segment averaged over each jaw is $$(\delta_n)_i = i\, z_i - (z_n)_i$$

If $(\delta_n)_i < 0$ then go to the next segment.

From strength of materials, the deformation of an axially loaded member is (PL)/(EA). Thus the force related to this shortening and acting along the line A'C is $$(F_{zn})_i = \frac{(\delta_n)_i E_{jaw} A_i^p}{(z_n)_i}$$

where $A_i^p = 2ab$

Total radial force at the jaw corner for the $i^{th}$ segment $$(F_{radial})_i^p = ((F_{radial}^{jaw})_i + (F_{zn})_i)\cos(\alpha_{2n})_i$$

Bearing stress for the $i^{th}$ segment $$(\sigma_n^{bear})_i^p = \frac{(F_{radial})_i}{A_i^p}$$

Check for yielding of the $i^{th}$ segment. If $$(\sigma_n^{bear})_i^p < \delta_{all}^{bear}$$

Then calculate the moment arm from the center of the bar to the force $$x_i = (R_b + (h_i \tan(\alpha_{2n})_i - (\tfrac{1}{2}t + a))\tan(\alpha_{2n})_i)\sin(\alpha_{2n})_i$$

Calculate the moment for the $i^{th}$ segment $$(M_x)_i = x_i(F_{zn})_i$$

Accumulate the moments for all segments along the jaw $$M_T = M_T + (M_x)_i$$

Go to next segment

If it is greater than or equal to the allowable bearing stress then decrease the deformations and re-calculate the force and bearing stress.

Set yield flag $IYLD_i = IPASS$ where IPASS is the pass number for incrementing the toggle angle $$(\delta_n)_i^m = (\delta_n)_i - m\Delta w_{bc}a = (\delta_n)_i - \delta_i^m$$

If the new deformation is less than zero, then set it to the deformation of the previous estimate $$(\delta_n)_i^m = \begin{cases} (\delta_n)_i \text{ for } m = 1 \\ (\delta_n)_i^{m-1} \text{ for } m > 1 \end{cases}$$

Calculate the new force related to the new shortening $$(F_{zn})_i^m = \frac{(\delta_n)_i^m E_{jaw} A_i^m}{(z_n)_i} \text{ where } A_i^m = b\left(\frac{\Delta t}{\cos\theta}\right)$$

Calculate new total radial force at the jaw corner for the $i^{th}$ segment $$(F_{radial})_i^m = ((F_{radial}^{jaw})_i + (F_{zn})_i^m)\cos(a_{2n})_i$$

Calculate new bearing stress $$(\sigma_n^{bear})_i^m = \frac{(F_{radial})_i^m}{A_i^m}$$

i
Check for yielding of the $i^{th}$ segment. If $$(\sigma_n^{bear})_i^m > \sigma_{all}^{bear}$$

then adjust the iteration counter to $m = m+1$ and loop back to re-calculate the deformations, the radial force, and bearing stress. Maximum of 100 iterations is set.

If this new bearing stress is less than the allowable value for the bearing stress, then the amount of yielding is determined.

If this is the initial yielding $$(Z_{ep})_i = 0$$

then calculate the maximum length of line A'C. At this condition the points O, A', and C are colinear and the line A'C has a maximum length of $$(Z_n)_i' = (Z_n)_i - (\delta_n)_i \times (\delta_n)_i^m$$

Now assign
$$(Z_{ep})_i = (Z_n)_i$$

Otherwise use the previously calculated value.
Calculate the elastic shortening of line A'C $$d' = (z_{ep})_i - \left(\frac{1}{2}\frac{t}{\sin\theta} - R_b\right) = (z_{ep})_i - l_{CD}$$

where $l_{CD}$ is the length required for contact.

If $d'$ is greater than zero then calculate the corresponding elastic force due to this elastic shortening.

$$(F_{zn})_i = \frac{d' E_{jaw} A'}{(z_{ep})_i} \text{ where } A' = 2ab$$

Now calculate the moment due to the Coulomb friction force for the $i^{th}$ segment $$(M_x)_i = R_b f_b (F_{zn})_i$$

Accumulate the moments $$M_T = M_T \times (M_x)_i$$

Go to next segment.

If $d'$ is less than or equal to zero then this segment has lost contact with the bar. Set the yield flag to a negative value $$IYLD_i = -IYLD_i$$

Go to next segment.

Calculate the total moment due to "toggle" for all jaws in the collet $$M_T^{total} = N_{jaws} M_T$$

Calculate the total torque $$T_T^{total} = T_{JPT}^{total} + M_T^{total}$$

Increment $\theta$ and repeat "toggle" calculations until $M_T^{total}$ is a maximum.

For each increment of toggle angle, the total moment due to toggle is calculated for all jaws in the collet. If this total moment is not a maximum value, then the toggle angle is incremented and the toggle calculations re-executed until the maximum torque at toggle is determined. The total torque on the bar is the sum of the torque just prior to toggle and the total moment at toggle.

The gripping strength of the collet is directly related to the total torque generated on the bar or tool extending through the collet. Thus, it should be understood that by varying the design parameters of the collet jaws and calculating total torque for each parameter change, an optimum set of parameters can be determined for maximizing collet gripping strength. For example, the graph provided below illustrates the effect on total torque, and thus gripping strength, of varying the jaw thickness for an ER258 collet configuration in increments of 0.01 inches. It was assumed that the default values of table 1 are acceptable and that the applied torque to nut on the collet holder was 350 in.-lbs. It was also assumed that, at most, only 10 jaws should be used in the design and that both extremes in bar or tool shaft diameter should be considered. As the graph illustrates, as jaw thickness increases, there is an increase in total torque (including toggle) up to a thickness of approximately 0.10 inches. Above this thickness, the total torque decreases. The effect of bar diameter on the total torque for a given jaw thickness is also indicated. Thus it should be readily understood how the analysis method and system according to the present invention can optimize jaw thickness to maximize gripping strength of the collet.

Figure 13:
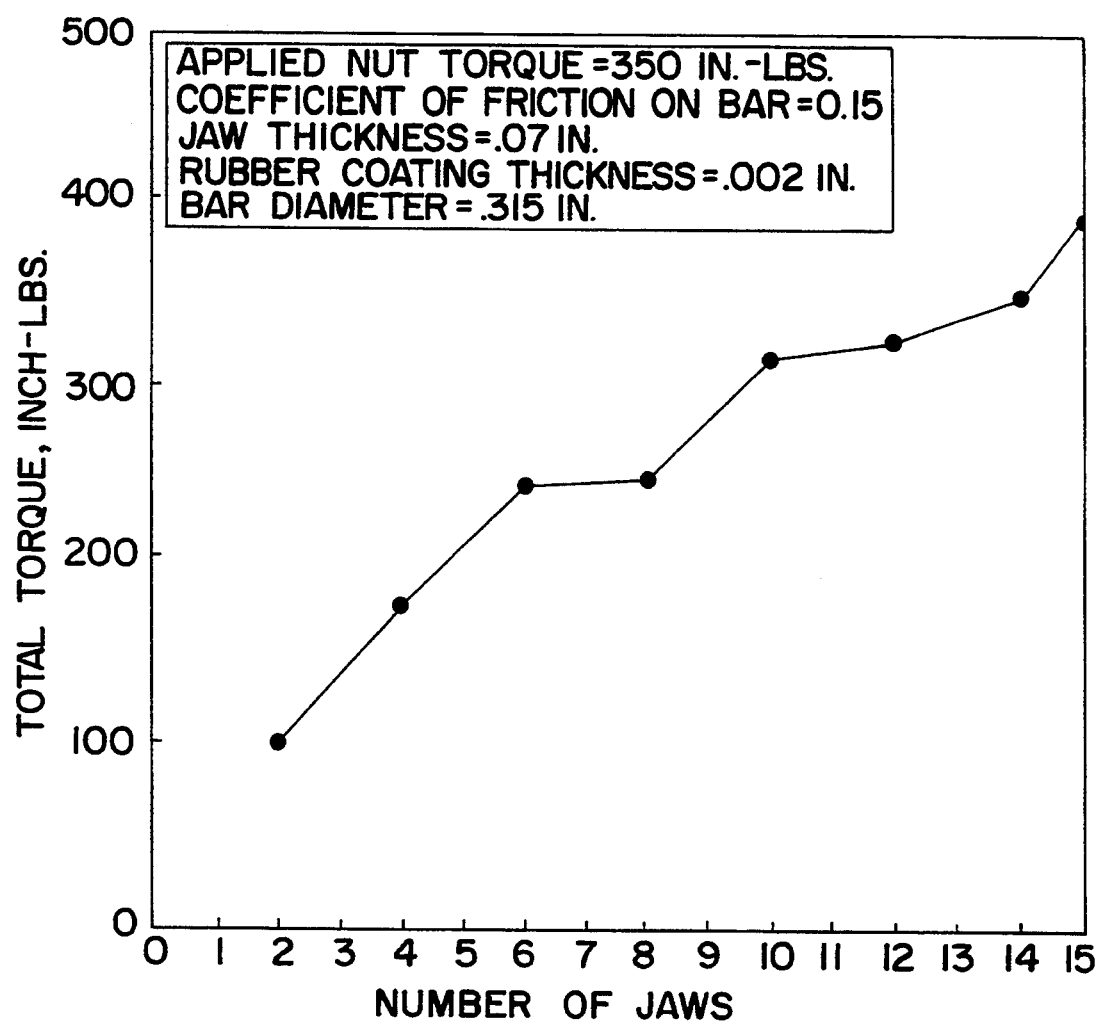
FIG. 13 is a graph illustrating the relationship between number of jaws and gripping strength.

The graph of FIG. 13 illustrates the effect of varying the number of jaws for an ER25-8 collet configuration assuming a jaw thickness of 0.07 inches. As the graph shows, generally as the number of jaws increases, there is an increase in total torque. However, between 10 and 14 jaws the total torque increased only 9%. Also, the graph illustrates to 15 jaws, and depending on the degree of resilient material on the jaw faces, the maximum number of jaws may decrease.

Figure 12:
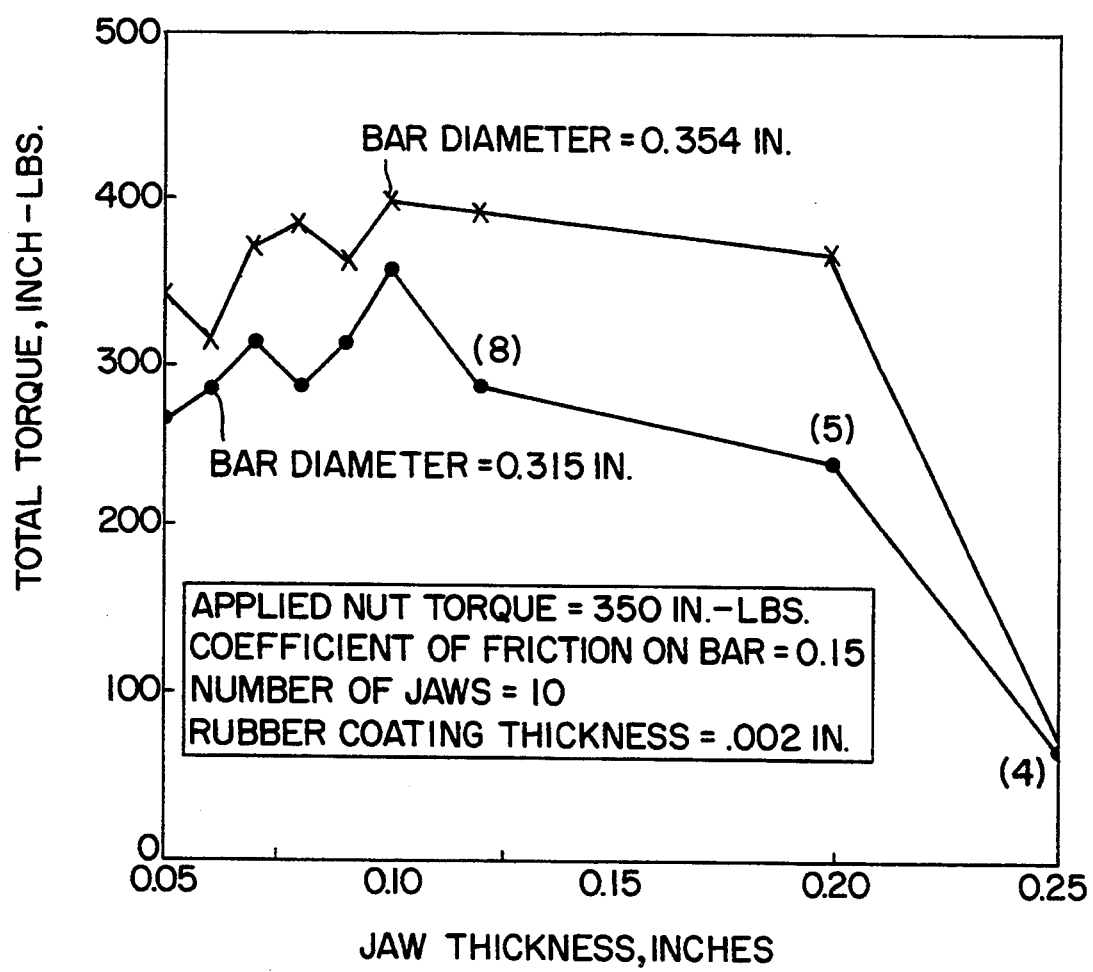
FIG. 12 is a graph illustrating the relationship between jaw thickness and gripping strength.

The graphs of FIGS. 12 and 13 illustrate the effect of varying only one parameter while assuming default or constant values for the other jaw parameters. The analysis method may also be executed to determine the optimum combination of parameters, such as thickness, number, and type material, for the jaws of a given configuration.

The analysis method of the present invention is preferably configured in a system 50, generally depicted in FIGS. 4 and 5. Means 52 are provided for varying the jaw parameters so as to optimize particular parameters. Means 54 are provided for calculating the radial force of the collet jaws upon the bar, as explained above. Means 56 are for calculating torque developed on the bar just prior to toggle between the jaw and bar, also as explained above. Means 58 are provided for calculating the maximum moment at toggle condition and for calculating the total torque developed on the bar 60. In a preferred embodiment, the various means comprise applicable software 64 for executing the calculations with system 50 being a computer, generally 62. System 50 preferably comprises a library 66 of parameters known for the wide variety of conventional collet configurations, and library 68 for collet nut geometry parameters. Interface means, generally 52, are provided for allowing an analyst to generate DIN ASME standard data, define default values, input collet parameters, etc.

As described above, the present invention includes a machine tool collet having gripping means for optimally holding a machine tool. The gripping means include jaws having at least one parameter optimized for maximizing the gripping strength of the collet. For example, collet 10 may have the number of jaws 16, or thickness of jaws 16, or material composition of jaws 16 optimized.

Table 3 below is a list of preferred embodiments of the present inventive collet designed according to the present analysis. For different collet configurations (i.e., TG50 and ER25) and capacity ranges, a preferred optimum number and thickness of jaw blades has been determined. The jaw blades are formed of 1070 high carbon steel. For ease of manufacture, the varying thicknesses of the jaw blades was limited to commercially available thicknesses. For example, 1070 high carbon steel is commercially available in thicknesses of 0.055, 0.075, and 0.100 inches, among others. Thus, for each of the configurations and capacities, the commercially available thicknesses of 1070 steel were analyzed to determine which thickness was optimum. Likewise, for each of the different thicknesses, the optimum number of jaw blades was determined until an optimum combination of blade number and blade thickness was determined.

It is desired in the industry to provide a collet which is effective over as wide a range as possible so as to limit the number of collets required. The present inventive method aids in this goal in that it allows for defining a collet which provides a high gripping strength over a wider range even though the combination of parameters may not be the best for a specific individual capacity within the range of the collet. For example, a preferred TG75 collet designed according to the invention with a capacity range of 17/32 to 9/16 inches comprises 8 jaw blades having a thickness of 0.130 inches. The combination of 8 blades and thickness of 0.130 inches is optimum in that it provides the highest overall gripping strength for a single collet within the given range even though for a collet having a capacity of only 9/16 inches, 7 jaw blades having a thickness of 0.130 inches produces a slightly greater total torque with toggle. However, the gripping strength provided by the collet having 8 blades at a capacity of 9/16 inches is only slightly less and is more than adequate for use in the industry. Thus, the parameters of number of blades and thickness of blades has been optimized over the range of 17/32 to 9/16 inches.

In this manner, the present inventive collets according to the invention offer a significant advantage over the state of the art. For example, with conventional split steel collets of the TG75 configuration, 17 collets are necessary to cover the range of 5/32 to ⅝ inches, whereas only 8 Rubber-Flex collets designed according to the present invention would be needed. Thus, the present inventive method for optimizing the gripping strength of a Rubber-Flex collet allows for precisely defining collets which are adequate over a wider range thereby significantly reducing the number of collets necessary and manufacturing costs. Table 3 below includes the combinations which have been optimized to provide a greater overall torque at toggle condition for the collet over the stated ranges.

TABLE 3

| CONFIGURATION | COLLET CAPACITY | JAW THICKNESS | NO. OF JAWS |
|---|---|---|---|
| TG25 (In.) | 1/16 | 0.055 | 4 |
| | 5/64 | 0.055 | 4 |
| | 3/32 | 0.055 | 4 |
| | 7/64 | 0.055 | 4 |
| | 1/8 | 0.055 | 4 |
| | 9/64 | 0.055 | 4 |
| | 5/32 | 0.055 | 4 |
| | 11/64 | 0.055 | 4 |
| | 3/16 | 0.055 | 4 |
| | 13/64 | 0.055 | 4 |
| | 7/32 | 0.075 | 4 |
| | 15/64 | 0.075 | 4 |
| | 1/4 | 0.075 | 4 |
| | 17/64 | 0.075 | 4 |
| TG50 (In.) | 5/32 | 0.055 | 4 |
| | 3/16 | 0.055 | 4 |
| | 7/32 | 0.055 | 4 |
| | 1/4 | 0.055 | 4 |
| | 9/32 | 0.075 | 5 |
| | 5/16 | 0.075 | 5 |
| | 11/32 | 0.075 | 5 |
| | 3/8 | 0.075 | 5 |
| | 13/32 | 0.013 | 5 |
| | 7/16 | 0.013 | 5 |
| | 15/32 | 0.013 | 5 |
| | 1/2 | 0.013 | 5 |
| | 17/32 | 0.013 | 5 |
| TG75 (In.) | 3/32 | 0.075 | 4 |
| | 1/8 | 0.075 | 4 |
| | 5/32 | 0.075 | 4 |

TABLE 3-continued

| CONFIGURATION | COLLET CAPACITY | JAW THICKNESS | NO. OF JAWS |
|---|---|---|---|
| | 3/16 | 0.075 | 4 |
| | 7/32 | 0.100 | 4 |
| | 1/4 | 0.100 | 4 |
| | 9/32 | 0.100 | 4 |
| | 5/16 | 0.100 | 4 |
| | 11/32 | 0.100 | 6 |
| | 3/8 | 0.100 | 6 |
| | 13/32 | 0.100 | 6 |
| | 7/16 | 0.100 | 6 |
| | 15/32 | 0.100 | 6 |
| | 1/2 | 0.100 | 6 |
| | 17/32 | 0.130 | 8 |
| | 9/16 | 0.130 | 8 |
| | 19/32 | 0.130 | 8 |
| | 5/8 | 0.130 | 8 |
| | 21/32 | 0.130 | 7 |
| | 11/16 | 0.130 | 7 |
| | 23/32 | 0.130 | 7 |
| | 3/4 | 0.130 | 7 |
| TG100 (In.) | 25/32 | 0.130 | 7 |
| | 1/8 | 0.100 | 6 |
| | 5/32 | 0.100 | 6 |
| | 3/16 | 0.100 | 6 |
| | 7/32 | 0.100 | 6 |
| | 1/4 | 0.100 | 6 |
| | 9/32 | 0.100 | 6 |
| | 5/16 | 0.100 | 6 |
| | 11/32 | 0.100 | 6 |
| | 3/8 | 0.100 | 6 |
| | 13/32 | 0.100 | 6 |
| | 7/16 | 0.100 | 6 |
| | 15/32 | 0.100 | 6 |
| | 1/2 | 0.100 | 6 |
| | 17/32 | 0.150 | 8 |
| | 9/16 | 0.150 | 8 |
| | 19/32 | 0.150 | 8 |
| | 5/8 | 0.150 | 8 |
| | 21/32 | 0.150 | 8 |
| | 11/16 | 0.150 | 8 |
| | 23/32 | 0.250 | 6 |
| | 3/4 | 0.250 | 6 |
| | 25/32 | 0.250 | 6 |
| | 13/16 | 0.250 | 6 |
| | 27/32 | 0.250 | 6 |
| | 7/8 | 0.250 | 6 |
| | 29/32 | 0.200 | 9 |
| | 15/16 | 0.200 | 9 |
| | 31/32 | 0.200 | 9 |
| | 1 | 0.200 | 9 |
| | 1 1/32 | 0.200 | 9 |
| TG150 (In.) | 17/32 | 0.150 | 6 |
| | 9/16 | 0.150 | 6 |
| | 19/32 | 0.150 | 6 |
| | 5/8 | 0.150 | 6 |
| | 21/32 | 0.150 | 8 |
| | 11/16 | 0.150 | 8 |
| | 23/32 | 0.150 | 8 |
| | 3/4 | 0.150 | 8 |
| | 25/32 | 0.150 | 8 |
| | 13/16 | 0.150 | 8 |
| | 27/32 | 0.200 | 8 |
| | 7/8 | 0.200 | 8 |
| | 29/32 | 0.200 | 8 |
| | 15/16 | 0.200 | 8 |
| | 31/32 | 0.200 | 8 |
| | 1 | 0.200 | 8 |
| | 1 1/32 | 0.200 | 8 |
| | 1 1/16 | 0.200 | 8 |
| | 1 3/32 | 0.200 | 8 |
| | 1 1/8 | 0.200 | 8 |
| | 1 5/32 | 0.200 | 10 |
| | 1 3/16 | 0.200 | 10 |
| | 1 7/32 | 0.200 | 10 |
| | 1 1/4 | 0.200 | 10 |
| | 1 9/32 | 0.200 | 10 |
| | 1 5/16 | 0.200 | 10 |
| | 1 11/32 | 0.200 | 10 |
| | 1 3/8 | 0.200 | 10 |
| | 1 13/32 | 0.200 | 11 |
| | 1 7/16 | 0.200 | 11 |
| | 1 15/32 | 0.200 | 11 |
| | 1 1/2 | 0.200 | 11 |
| | 1 17/32 | 0.200 | 11 |
| ER11 (mm) | 1.0 | 0.055 | 4 |
| | 1.5 | 0.055 | 4 |
| | 2.0 | 0.055 | 4 |
| | 2.5 | 0.055 | 4 |
| | 3.0 | 0.055 | 4 |
| | 3.5 | 0.055 | 4 |
| | 4.0 | 0.055 | 4 |
| | 4.5 | 0.055 | 6 |
| | 5.0 | 0.055 | 6 |
| | 5.5 | 0.055 | 6 |
| | 6.0 | 0.055 | 6 |
| | 6.5 | 0.055 | 6 |
| | 7.0 | 0.055 | 6 |
| ER16 (mm) | 1.0 | 0.055 | 4 |
| | 2.0 | 0.055 | 4 |
| | 3.0 | 0.055 | 4 |
| | 4.0 | 0.055 | 4 |
| | 5.0 | 0.055 | 5 |
| | 6.0 | 0.055 | 5 |
| | 7.0 | 0.055 | 5 |
| | 8.0 | 0.055 | 8 |
| | 9.0 | 0.055 | 8 |
| | 10.0 | 0.055 | 8 |
| ER20 (mm) | 2.0 | 0.055 | 4 |
| | 3.0 | 0.055 | 4 |
| | 4.0 | 0.055 | 4 |
| | 5.0 | 0.055 | 4 |
| | 6.0 | 0.055 | 6 |
| | 7.0 | 0.055 | 6 |
| | 8.0 | 0.055 | 6 |
| | 9.0 | 0.055 | 6 |
| | 10.0 | 0.130 | 5 |
| | 11.0 | 0.130 | 5 |
| | 12.0 | 0.130 | 5 |
| | 13.0 | 0.130 | 5 |
| ER25 (mm) | 2.0 | 0.075 | 5 |
| | 3.0 | 0.075 | 6 |
| | 4.0 | 0.075 | 6 |
| | 5.0 | 0.075 | 6 |
| | 6.0 | 0.075 | 6 |
| | 7.0 | 0.120 | 6 |
| | 8.0 | 0.120 | 6 |
| | 9.0 | 0.120 | 6 |
| | 10.0 | 0.120 | 6 |
| | 11.0 | 0.120 | 6 |
| | 12.0 | 0.120 | 6 |
| | 13.0 | 0.075 | 10 |
| | 14.0 | 0.200 | 5 |
| | 15.0 | 0.200 | 5 |
| | 16.0 | 0.200 | 5 |
| ER32 (mm) | 3.0 | 0.075 | 6 |
| | 4.0 | 0.075 | 6 |
| | 5.0 | 0.075 | 6 |
| | 6.0 | 0.075 | 6 |
| | 7.0 | 0.130 | 4 |
| | 8.0 | 0.130 | 4 |
| | 9.0 | 0.130 | 4 |
| | 10.0 | 0.130 | 4 |
| | 11.0 | 0.200 | 4 |
| | 12.0 | 0.200 | 4 |
| | 13.0 | 0.200 | 4 |
| | 14.0 | 0.200 | 4 |
| | 15.0 | 0.200 | 6 |
| | 16.0 | 0.200 | 6 |
| | 17.0 | 0.200 | 6 |
| | 18.0 | 0.200 | 6 |
| | 19.0 | 0.200 | 6 |
| | 20.0 | 0.200 | 6 |
| ER40 (mm) | 4.0 | 0.130 | 4 |
| | 5.0 | 0.130 | 4 |
| | 6.0 | 0.130 | 4 |
| | 7.0 | 0.130 | 4 |
| | 8.0 | 0.150 | 4 |
| | 9.0 | 0.150 | 4 |
| | 10.0 | 0.150 | 4 |
| | 11.0 | 0.150 | 4 |
| | 12.0 | 0.150 | 4 |

TABLE 3-continued

| CONFIGURATION | COLLET CAPACITY | JAW THICKNESS | NO. OF JAWS |
|---|---|---|---|
| | 13.0 | 0.200 | 6 |
| | 14.0 | 0.200 | 6 |
| | 15.0 | 0.200 | 6 |
| | 16.0 | 0.200 | 6 |
| | 17.0 | 0.200 | 6 |
| | 18.0 | 0.200 | 6 |
| | 19.0 | 0.200 | 8 |
| | 20.0 | 0.200 | 8 |
| | 21.0 | 0.200 | 8 |
| | 22.0 | 0.200 | 8 |
| | 23.0 | 0.200 | 8 |
| | 24.0 | 0.200 | 8 |
| | 25.0 | 0.200 | 8 |
| | 26.0 | 0.200 | 7 |
| ER50 (mm) | 12.0 | 0.130 | 5 |
| | 14.0 | 0.130 | 5 |
| | 16.0 | 0.130 | 5 |
| | 18.0 | 0.150 | 5 |
| | 20.0 | 0.150 | 5 |
| | 22.0 | 0.150 | 5 |
| | 24.0 | 0.150 | 5 |
| | 26.0 | 0.200 | 7 |
| | 28.0 | 0.200 | 7 |
| | 30.0 | 0.200 | 7 |
| | 32.0 | 0.200 | 7 |
| | 34.0 | 0.200 | 7 |

It will be apparent to those skilled in the art that various modifications and variations can be made in the present invention without departing from the scope or spirit of the invention. Thus, it is intended that the present invention cover such modifications and variations as come within the scope of the appended claims.

What is claimed is:

1. A machine tool collet which is actuated by engagement with a mating surface of a collet holder, said collet being of a given outer diameter configuration and inner diameter capacity, comprising:

a plurality of gripping jaws held in a desired longitudinally and angularly spaced relation about a longitudinal centerline axis through said collet, said gripping jaws having an inner face parallel to the centerline axis whereby said plurality of gripping jaws define an opening through said collet for receiving a tool shank, said opening defining the capacity of said collet, said gripping jaws having an outer face whereby said plurality of gripping jaws defines an outer surface for engaging the collet holder mating surface, said outer face defining an outer diameter configuration of said collet, the number of said gripping jaws defining a first variable design parameter of said collet, the thickness of said gripping jaws defining a second variable design parameter of said collet, and the type material of said gripping jaws defining a third variable design parameter of said collet;

resilient material disposed between said gripping jaws for holding said plurality of gripping jaws in said desired spaced relation; and wherein for a given configuration and capacity of said collet, at least one of said variable design parameters being selected for given values of said other variable design parameters so that with respect to said at least one design parameter said collet generates the maximum total torque possible on a bar passing therethrough, maximum total torque being the torque generated by said gripping jaws on said bar just prior to a toggle condition existing between said gripping jaws and said bar, and total moment force generated by said gripping jaws at a toggle condition.

2. The machine tool collet as in claim 1, wherein said gripping jaws comprise a thickness which maximizes said total torque for given values of said other design parameters.

3. The machine tool collet as in claim 1, wherein said gripping jaws comprise a type material which maximizes said total torque for given values of said other design parameters.

4. The machine tool collet as in claim 1, wherein said gripping jaws comprise a number which maximizes said total torque for given values of said other design parameters.

5. The machine tool collet as in claim 1, wherein all of said variable design parameters have been selected so that said collet generates maximum possible total torque with respect to all of said design parameters.

6. A machine tool collet which is actuated by engagement with a mating surface of a collet holder, said collet being of a given outer diameter configuration and inner diameter capacity range, comprising:

a plurality of gripping jaws held in a desired longitudinally and angularly spaced relation about a longitudinal centerline axis through said collet, said gripping jaws having an inner face parallel to the centerline axis whereby said plurality of gripping jaws define an opening through said collet for receiving a tool shank, said opening defining the capacity of said collet, said gripping jaws having an outer face whereby said plurality of gripping jaws defines an outer surface for engaging the collet holder mating surface, said outer face defining an outer diameter configuration of said collet, the number of said gripping jaws defining a first variable design parameter of said collet, the thickness of said gripping jaws defining a second variable design parameter of said collet, and the type material of said gripping jaws defining a third variable design parameter of said collet;

resilient material disposed between said gripping jaws for holding said plurality of gripping jaws in said desired spaced relation; and wherein for a given configuration of said collet within a given capacity range, at least one of said variable design parameters being selected for given values of said other variable design parameters so that with respect to said at least one design parameter said collet generates an optimum overall total torque over the given capacity range on a bar passing therethrough, total torque being the torque generated by said gripping jaws on said bar just prior to a toggle condition existing between said gripping jaws and said bar, and total moment force generated by said gripping jaws at a toggle condition with the bar passing therethrough.

7. The machine tool collet as in claim 6, wherein said collet comprises a TG75 collet having a capacity generally of 5/32 to 3/16 inches, said collet comprising four said jaw blades having a thickness of approximately 0.0745 inches.

8. The machine tool collet as in claim 6, wherein said collet comprises a TG75 collet having a capacity of generally 7/32 to ¼ inches, said collet comprising four said jaw blades having a thickness of approximately 0.100 inches.

9. The machine tool collet as in claim 6, wherein said collet comprises a TG75 collet having a capacity of generally 9/32 to 5/16 inches, said collet comprising four said jaw blades having a thickness of approximately 0.100 inches.

10. The machine tool collet as in claim 6, wherein said collet comprises a TG75 collet having a capacity of generally 11/32 to ⅜ inches, said collet comprising six said jaw blades having a thickness of approximately 0.100 inches.

11. The machine tool collet as in claim 6, wherein said collet comprises a TG75 collet having a capacity of generally 13/32 to 7/16 inches, said collet comprising six said jaw blades having a thickness of approximately 0.100 inches.

12. The machine tool collet as in claim 6, wherein said collet comprises a TG75 collet having a capacity of generally 15/32 to ½ inches, said collet comprising six said jaw blades having a thickness of approximately 0.100 inches.

13. The machine tool collet as in claim 6, wherein said collet comprises a TG75 collet having a capacity of generally 17/32 to 9/16 inches, said collet comprising eight said jaw blades having a thickness of approximately 0.130 inches.

14. The machine tool collet as in claim 6, wherein said collet comprises a TG75 collet having a capacity of generally 19/32 to ⅝ inches, said collet comprising eight said jaw blades having a thickness of approximately 0.130 inches.

15. The machine tool collet as in claim 6, wherein said collet comprises a TG100 collet having a capacity of generally 11/32 to ⅜ inches, said collet comprising six said jaw blades having a thickness of approximately 0.100 inches.

16. The machine tool collet as in claim 6, wherein said collet comprises a TG100 collet having a capacity of generally 13/32 to 7/16 inches, said collet comprising six said jaw blades having a thickness of approximately 0.100 inches.

17. The machine tool collet as in claim 6, wherein said collet comprises a TG100 collet having a capacity of generally 15/32 to ½ inches, said collet comprising six said jaw blades having a thickness of approximately 0.100 inches.

18. The machine tool collet as in claim 6, wherein said collet comprises a TG100 collet having a capacity of generally 17/32 to 9/16 inches, said collet comprising eight said jaw blades having a thickness of approximately 0.150 inches.

19. The machine tool collet as in claim 6, wherein said collet comprises a TG100 collet having a capacity of generally 19/32 to ⅝ inches, said collet comprising eight said jaw blades having a thickness of approximately 0.150 inches.

20. The machine tool collet as in claim 6, wherein said collet comprises a TG100 collet having a capacity of generally 21/32 to 11/16 inches, said collet comprising eight said jaw blades having a thickness of approximately 0.150 inches.

21. The machine tool collet as in claim 6, wherein said collet comprises a TG100 collet having a capacity of generally 23/32 to ¾ inches, said collet comprising six said jaw blades having a thickness of approximately 0.250 inches.

22. The machine tool collet as in claim 6, wherein said collet comprises a TG100 collet having a capacity of generally 25/32 to 13/16 inches, said collet comprising six said jaw blades having a thickness of approximately 0.250 inches.

23. The machine tool collet as in claim 6, wherein said collet comprises a TG100 collet having a capacity of generally 27/32 to ⅞ inches, said collet comprising six said jaw blades having a thickness of approximately 0.250 inches.

24. The machine tool collet as in claim 6, wherein said collet comprises a TG150 collet having a capacity of generally 15/32 to ½ inches, said collet comprising six said jaw blades having a thickness of approximately 0.150 inches.

25. The machine tool collet as in claim 6, wherein said collet comprises a TG150 collet having a capacity of generally 17/32 to 9/16 inches, said collet comprising six said jaw blades having a thickness of approximately 0.150 inches.

26. The machine tool collet as in claim 6, wherein said collet comprises a TG150 collet having a capacity of generally 19/32 to ⅝ inches, said collet comprising six said jaw blades having a thickness of approximately 0.150 inches.

27. The machine tool collet as in claim 6, wherein said collet comprises a TG150 collet having a capacity of generally 21/32 to 11/16 inches, said collet comprising eight said jaw blades having a thickness of approximately 0.150 inches.

28. The machine tool collet as in claim 6, wherein said collet comprises a TG150 collet having a capacity of generally 23/32 to ¾ inches, said collet comprising eight said jaw blades having a thickness of approximately 0.150 inches.

29. The machine tool collet as in claim 6, wherein said collet comprises a TG150 collet having a capacity of generally 25/32 to 13/16 inches, said collet comprising eight said jaw blades having a thickness of approximately 0.150 inches.

30. The machine tool collet as in claim 6, wherein said collet comprises a TG150 collet having a capacity of generally 27/32 to ⅞ inches, said collet comprising eight said jaw blades having a thickness of approximately 0.200 inches.

31. The machine tool collet as in claim 6, wherein said collet comprises a TG150 collet having a capacity of generally 29/32 to 15/16 inches, said collet comprising eight said jaw blades having a thickness of approximately 0.200 inches.

32. The machine tool collet as in claim 6, wherein said collet comprises a TG150 collet having a capacity of generally 31/32 to 1.0 inches, said collet comprising eight said jaw blades having a thickness of approximately 0.200 inches.

33. The machine tool collet as in claim 6, wherein said collet comprises a TG150 collet having a capacity of generally 1 and 1/32 to 1 and 1/16 inches, said collet comprising eight said jaw blades having a thickness of approximately 0.200 inches.

34. The machine tool collet as in claim 6, wherein said collet comprises a TG150 collet having a capacity of generally 1 and 3/32 to 1 and ⅛ inches, said collet comprising eight said jaw blades having a thickness of approximately 0.200 inches.

35. The machine tool collet as in claim 6, wherein said collet comprises a TG150 collet having a capacity of generally 1 and 5/32 to 1 and 3/16 inches, said collet comprising ten said jaw blades having a thickness of approximately 0.200 inches.

36. The machine tool collet as in claim 6, wherein said collet comprises a TG150 collet having a capacity of generally 1 and 7/32 to 1 and ¼ inches, said collet comprising ten said jaw blades having a thickness of approximately 0.200 inches.

37. The machine tool collet as in claim 6, wherein said collet comprises a TG150 collet having a capacity of generally 1 and 9/32 to 1 and 5/16 inches, said collet comprising ten said jaw blades having a thickness of approximately 0.200 inches.

38. The machine tool collet as in claim 6, wherein said collet comprises a TG150 collet having a capacity of generally 1 and 11/32 to 1 and ⅜ inches, said collet comprising ten said jaw blades having a thickness of approximately 0.200 inches.

39. The machine tool collet as in claim 6, wherein said collet comprises an ER25 collet having a capacity of generally 4.5 to 6 millimeters, said collet comprising six said jaw blades having a thickness of approximately 0.0745 inches.

40. The machine tool collet as in claim 6, wherein said collet comprises an ER25 collet having a capacity of generally 6.5 to 8 millimeters, said collet comprising six said jaw blades having a thickness of approximately 0.120 inches.

41. The machine tool collet as in claim 6, wherein said collet comprises an ER25 collet having a capacity of generally 8.5 to 10 millimeters, said collet comprising six said jaw blades having a thickness of approximately 0.120 inches.

42. The machine tool collet as in claim 6, wherein said collet comprises an ER25 collet having a capacity of generally 10.5 to 12 millimeters, said collet comprising six said jaw blades having a thickness of approximately 0.120 inches.

43. The machine tool collet as in claim 6, wherein said collet comprises an ER32 collet having a capacity of generally 4.5 to 6 millimeters, said collet comprising six said jaw blades having a thickness of approximately 0.0745 inches.

44. The machine tool collet as in claim 6, wherein said collet comprises an ER32 collet having a capacity of generally 6.5 to 8 millimeters, said collet comprising four said jaw blades having a thickness of approximately 0.130 inches.

45. The machine tool collet as in claim 6, wherein said collet comprises an ER32 collet having a capacity of generally 8.5 to 10 millimeters, said collet comprising four said jaw blades having a thickness of approximately 0.130 inches.

46. The machine tool collet as in claim 6, wherein said collet comprises an ER32 collet having a capacity of generally 10.5 to 12 millimeters, said collet comprising four said jaw blades having a thickness of approximately 0.200 inches.

47. The machine tool collet as in claim 6, wherein said collet comprises an ER32 collet having a capacity of generally 12.5 to 14 millimeters, said collet comprising four said jaw blades having a thickness of approximately 0.200 inches.

48. The machine tool collet as in claim 6, wherein said collet comprises an ER32 collet having a capacity of generally 14.5 to 16 millimeters, said collet comprising six said jaw blades having a thickness of approximately 0.200 inches.

49. The machine tool collet as in claim 6, wherein said collet comprises an ER32 collet having a capacity of generally 16.5 to 18 millimeters, said collet comprising six said jaw blades having a thickness of approximately 0.200 inches.

50. The machine tool collet as in claim 6, wherein said collet comprises an ER40 collet having a capacity of generally 3.5 to 5 millimeters, said collet comprising four said jaw blades having a thickness of approximately 0.130 inches.

51. The machine tool collet as in claim 6, wherein said collet comprises an ER40 collet having a capacity of generally 5.5 to 7 millimeters, said collet comprising four said jaw blades having a thickness of approximately 0.130 inches.

52. The machine tool collet as in claim 6, wherein said collet comprises an ER40 collet having a capacity of generally 7.5 to 9 millimeters, said collet comprising four said jaw blades having a thickness of approximately 0.150 inches.

53. The machine tool collet as in claim 6, wherein said collet comprises an ER40 collet having a capacity of generally 9.5 to 11 millimeters, said collet comprising four said jaw blades having a thickness of approximately 0.150 inches.

54. The machine tool collet as in claim 6, wherein said collet comprises an ER40 collet having a capacity of generally 11.5 to 13 millimeters, said collet comprising four said jaw blades having a thickness of approximately 0.150 inches.

55. The machine tool collet as in claim 6, wherein said collet comprises an ER40 collet having a capacity of generally 13.5 to 15 millimeters, said collet comprising six said jaw blades having a thickness of approximately 0.200 inches.

56. The machine tool collet as in claim 6, wherein said collet comprises an ER40 collet having a capacity of generally 15.5 to 17 millimeters, said collet comprising six said jaw blades having a thickness of approximately 0.200 inches.

57. The machine tool collet as in claim 6, wherein said collet comprises an ER40 collet having a capacity of generally 17.5 to 19 millimeters, said collet comprising six said jaw blades having a thickness of approximately 0.200 inches.

58. The machine tool collet as in claim 6, wherein said collet comprises an ER40 collet having a capacity of generally 19.5 to 21 millimeters, said collet comprising eight said jaw blades having a thickness of approximately 0.200 inches.

59. The machine tool collet as in claim 6, wherein said collet comprises an ER40 collet having a capacity of generally 21.5 to 23 millimeters, said collet comprising eight said jaw blades having a thickness of approximately 0.200 inches.

60. The machine tool collet as in claim 6, wherein said collet comprises an ER40 collet having a capacity of generally 23.5 to 25 millimeters, said collet comprising eight said jaw blades having a thickness of approximately 0.200 inches.

61. A machine tool collet which is actuated by engagement with a mating surface of a collet holder, said collet being of a given outer diameter configuration and inner diameter capacity, said collet comprising a plurality of variable design parameters including a number of gripping jaws, thickness of said gripping jaws, and type of material of said gripping jaws, said gripping jaws held in a desired longitudinally and angularly spaced relation about a longitudinal centerline axis through said collet, said collet further comprising resilient material disposed between said gripping jaws for holding said plurality of gripping jaws in said desired spaced relation, for a given type of resilient material and given type of jaw material the number and thickness of said jaws being determined by:
- determining the radial force of said gripping jaws upon a bar disposed through said collet, the radial force being dependent upon an axial force applied to said collet;
- determining the torque developed on the bar from the radial forces of said gripping jaws just prior to a toggle condition between said gripping jaws and the bar;
- determining the total moment force generated between said gripping jaws and the bar through said collet at toggle condition for a given toggle angle;
- varying the toggle angle until the total moment force between said gripping jaws and the bar at toggle condition reaches a maximum; and
- determining the total torque on the bar by summing the torque prior to toggle and the maximum total moment force at toggle condition;
- whereby an optimum number and thickness of said gripping jaws for a given collet configuration and capacity is determined by varying the number and thickness of said gripping jaws until the total torque is maximized for number or thickness of said gripping jaws.

62. The machine tool collet as in claim 61, wherein the thickness of said gripping jaws is determined by varying thickness of said gripping jaws for a given collet configuration and capacity and given number of said gripping jaws until a thickness generating maximum total torque for said collet is determined.

63. The machine tool collet as in claim 61, wherein the number of said gripping jaws is determined by varying the number of said gripping jaws for a given collet configuration and capacity and given thickness of said gripping jaws until a number generating maximum total torque for said collet is determined.

64. The machine tool collet as in claim 61, wherein the type material of said gripping jaws is determined by varying the type material for a given collet configuration and capacity and given number and thickness of said gripping jaws until a type material generating maximum total torque for said collet is determined.

65. The machine tool collet as in claim 61, wherein the thickness, number, and type material of said gripping jaws is determined by varying the combination of thickness, number, and type material until a combination of thickness, number, and type material generating maximum total torque for said collet is determined.

* * * * *